(12) United States Patent
Oyamada et al.

(10) Patent No.: US 11,301,763 B2
(45) Date of Patent: Apr. 12, 2022

(54) PREDICTION MODEL GENERATION SYSTEM, METHOD, AND PROGRAM

(71) Applicant: NEC CORPORATION, Tokyo (JP)

(72) Inventors: Masafumi Oyamada, Tokyo (JP); Shinji Nakadai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 520 days.

(21) Appl. No.: 16/349,505

(22) PCT Filed: Oct. 31, 2017

(86) PCT No.: PCT/JP2017/039360
§ 371 (c)(1),
(2) Date: May 13, 2019

(87) PCT Pub. No.: WO2018/088277
PCT Pub. Date: May 17, 2018

(65) Prior Publication Data
US 2019/0340520 A1 Nov. 7, 2019

(30) Foreign Application Priority Data
Nov. 14, 2016 (JP) .............................. JP2016-221114

(51) Int. Cl.
*G06N 5/04* (2006.01)
*G06N 20/00* (2019.01)
*G06F 16/28* (2019.01)

(52) U.S. Cl.
CPC ............. *G06N 5/04* (2013.01); *G06F 16/285* (2019.01); *G06N 20/00* (2019.01)

(58) Field of Classification Search
None
See application file for complete search history.

(56) References Cited

U.S. PATENT DOCUMENTS

2009/0055139 A1* 2/2009 Agarwal ................ G06Q 10/04
703/2

FOREIGN PATENT DOCUMENTS

| JP | 2009-163615 A | 7/2009 |
| WO | 20013/027553 A1 | 2/2013 |
| WO | 2016/092767 A1 | 6/2016 |

OTHER PUBLICATIONS

Dai, Wenyuan, et al. "Co-clustering based classification for out-of-domain documents." Proceedings of the 13th ACM SIGKDD international conference on Knowledge discovery and data mining. 2007. (Year: 2007).*

(Continued)

*Primary Examiner* — Daniel T Pellett
(74) *Attorney, Agent, or Firm* — Sughrue Mion, PLLC

(57) ABSTRACT

A prediction model generation system is provided that is capable of generating a prediction model for accurately predicting a relationship between an ID of a record in first master data and an ID of a record in second master data. Co-clustering means 71 performs co-clustering processing for performing co-clustering on first IDs and second IDs in accordance with first master data, second master data, and fact data indicating a relationship between each of the first IDs and each of the second IDs. Prediction model generation means 72 performs prediction model generation processing for generating a prediction model for each combination of a first ID cluster and a second ID cluster. The prediction model uses the relationship between each of the first IDs and each of the second IDs as an objective variable. The first ID cluster serves as a cluster of the first IDs. The second ID cluster serves as a cluster of the second IDs. The prediction model generation processing and the co-clustering processing are repeated until it is determined that a prescribed condition is satisfied.

8 Claims, 13 Drawing Sheets

(56) References Cited

OTHER PUBLICATIONS

Corinna Cortes et al., Support-Vector Networks, MAchine Learning, Mar. 8, 1995, pp. 273-297, vol. 20.
Shuhei Kuwata et al., "Co-clustering Discrete Data Based on the Dirichlet Process Mixture Model", Journal of Information Processing, Nov. 15, 2008, pp. 60-73, vol. 1, No. 1.
Shuhei Kuwata et al., "Variable Order Transition Probability Markov Decision Process for the Recommendation System", Journal of Information Processing, Apr. 15, 2013, pp. 20-30, vol. 6, No. 1.
International Search Report for PCT/JP2017/039360 dated, Feb. 6, 2018 (PCT/ISA/210).

\* cited by examiner

FIG. 1

|  |  | MERCHANDISE ID | | | |
|---|---|---|---|---|---|
|  |  | 1 | 2 | 3 | 4 |
| CUSTOMER ID | 1 | 0 | 1 | 0 | 0 |
|  | 2 | 0 | 0 | 0 | 0 |
|  | 3 | 0 | 0 | 1 | 1 |
|  | 4 | 0 | 0 | 0 | 0 |

FIG. 3

|  |  | MERCHANDISE ID CLUSTER (SECOND ID CLUSTER) | | |
|---|---|---|---|---|
|  |  | 1 (OUTDOOR GOODS) | 2 (ENERGY DRINK) | 3 (AV EQUIPMENT) |
| CUSTOMER ID CLUSTER (FIRST ID CLUSTER) | 1 (OUTDOOR PERSON) | $w_{11}$ | $w_{12}$ | $w_{13}$ |
| | 2 (INDOOR PERSON) | $w_{21}$ | $w_{22}$ | $w_{23}$ |
| | 3 (PERSON WITH VARIETY OF INTERESTS) | $w_{31}$ | $w_{32}$ | $w_{33}$ |

FIG. 4

|  |  | CUSTOMER ID CLUSTER (FIRST ID CLUSTER) | | |
|---|---|---|---|---|
|  |  | 1 | 2 | 3 |
| CUSTOMER ID (FIRST ID) | 1 | 0.3 | 0.1 | 0.6 |
| | 2 | 0.7 | 0.2 | 0.1 |
| | 3 | 0.1 | 0.9 | 0.1 |
| | 4 | 0.2 | 0.7 | 0.1 |

|  |  | MERCHANDISE ID CLUSTER (SECOND ID CLUSTER) | | |
|---|---|---|---|---|
|  |  | 1 | 2 | 3 |
| MERCHANDISE ID (SECOND ID) | 1 | 0.1 | 0.8 | 0.1 |
| | 2 | 0.5 | 0.3 | 0.2 |
| | 3 | 0.7 | 0.1 | 0.2 |
| | 4 | 0.2 | 0.2 | 0.6 |

FIG. 7

| | | | CASE WHERE MEMBERSHIP PROBABILITY OF SECOND ID "1" IS OBTAINED |
|---|---|---|---|
| | | | SECOND ID CLUSTER |
| | | | 2 |
| | FIRST ID CLUSTER | 1 | $w_{12}$ |
| "1"~"4" | | 2 | $w_{22}$ |
| "1"~"4" | | 3 | $w_{32}$ |
| "1"~"4" | | | |

| CUSTOMER ID | AGE |
|---|---|
| 1 | 20 |
| 2 | 25 |
| 3 | 50 |
| 4 | 60 |

| MERCHANDISE ID | PRICE |
|---|---|
| 1 | 200 |
| 2 | 2500 |
| 3 | 500 |
| 4 | 6000 |

FIG. 18

| CUSTOMER ID | MERCHANDISE ID |
|---|---|
| 1 | 2 |
| 3 | 3 |
| 3 | 4 |

FIG. 19

| CUSTOMER ID | MERCHANDISE ID | AGE | PRICE | PURCHASE RESULTS |
|---|---|---|---|---|
| 1 | 1 | 20 | 200 | 0 |
| 1 | 2 | 20 | 2500 | 1 |
| 3 | 3 | 50 | 500 | 1 |
| 3 | 4 | 50 | 6000 | 1 |

PREDICTION MODEL GENERATION SYSTEM, METHOD, AND PROGRAM

CROSS REFERENCE TO RELATED APPLICATIONS

This application is a National Stage of International Application No. PCT/JP2017/039360 filed Oct. 31, 2017, claiming priority based on Japanese Patent Application No. 2016-221114, filed Nov. 14, 2016, the entire disclosure of which is incorporated herein.

TECHNICAL FIELD

The present invention relates to a prediction model generation system, a prediction model generation method, and a prediction model generation program that generate a prediction model for predicting a relationship between two types of matters.

BACKGROUND ART

Information is managed as tabular form data in some cases. The tabular form data is roughly classified into two types of data, "master data" and "fact data". The master data includes a plurality of records. Each of the plurality of records includes an ID of the record and an attribute value that corresponds to the ID. In addition, the fact data is data indicating a relationship between an ID of a record in a certain piece of master data and an ID of a record in another piece of master data.

For example, in the field of retail or the like, information relating to customers and information relating to merchandise are managed as respective pieces of master data. FIG. 16 depicts an exemplary diagram illustrating an example of master data relating to customers. FIG. 17 depicts an exemplary diagram illustrating an example of master data relating to merchandise. In the master data illustrated in FIG. 16, an ID of each record is a customer ID. In addition, in FIG. 16, the age of a customer is illustrated as an attribute value that corresponds to the customer ID. In the master data illustrated in FIG. 17, an ID of each record is a merchandise ID. In addition, in FIG. 17, the price of a piece of merchandise is illustrated as an attribute value that corresponds to the merchandise ID.

Further, an example of the fact data includes data indicating a relationship between the customer ID and the merchandise ID. For example, a relationship of whether there are results of a customer specified by a customer ID purchasing merchandise specified by a merchandise ID can be indicated by using the fact data. The fact data described above can be referred to as purchase results data. FIG. 18 depicts an explanatory diagram illustrating an example of the fact data. In the example depicted in FIG. 18, the presence of a record including a certain customer ID and a certain merchandise ID indicates the presence of results of a customer specified by the certain customer ID purchasing merchandise specified by the certain merchandise ID. In addition, the absence of a record including a certain customer ID and a certain merchandise ID indicates the absence of results of a customer specified by the certain customer ID purchasing merchandise specified by the certain merchandise ID. For example, the example depicted in FIG. 18 indicates the presence of results of a customer having the customer ID "1" purchasing a piece of merchandise having the merchandise ID "2", and the like. In addition, there is not a record including the customer ID "1" and the merchandise ID "1". This indicates the absence of results of the customer having the customer ID "1" purchasing a piece of merchandise having the merchandise ID "1". Further, in the fact data illustrated in FIG. 18, in general, information indicating date and time when a customer purchased a piece of merchandise, information indicating a store where the customer purchased the piece of merchandise, or other information is also included as a column.

In addition, NPL 1 describes supervised learning.

Further, PTL 1 describes a system that performs grouping on each of merchandise and customers. Furthermore, PTL 2 describes an apparatus that performs co-clustering on users and items.

CITATION LIST

Patent Literature

PTL 1: International Publication No. WO 2016/092767
PTL 2: Japanese Patent Application Laid-Open No. 2009-163615

Non Patent Literature

NPL 1: Corinna Cortes and Vladimir Vapnik, "Support-Vector Networks", Machine Learning, 20, pages 273-297, 1995

SUMMARY OF INVENTION

Technical Problem

In the field of marketing, it is important to predict "whether a certain customer will purchase a certain piece of merchandise". For example, the fact data depicted in FIG. 18 indicates that a customer having the customer ID "1" has not purchased merchandise having the merchandise ID "1". Here, it is important to be able to predict whether there is originally a low probability of the customer purchasing the merchandise, whether there is a high probability of the customer purchasing the merchandise in the future although the customer has not purchased the merchandise at a present point in time, or the like. It can be said that this is a problem of predicting the presence or absence of a record in the fact data illustrated in FIG. 18. It is conceivable that this problem is solved by learning a prediction model in the supervised learning described in NPL 1. Assume, for example, that an outer join of the master data illustrated in FIG. 16 and the master data depicted in FIG. 17 is obtained and data obtained by adding a column indicating purchase results is generated. An example of the data described above is depicted in FIG. 19. In the example depicted in FIG. 19, the value "1" of purchase results means the presence of purchase results, and the value "0" of purchase results means the absence of purchase results.

By using the data illustrated in FIG. 19 as teaching data, using age and a price as explanatory variables, and using purchase results as an objective variable, a prediction model can be learnt in the supervised learning described in NPL 1. This prediction model is obtained, for example, in the form of the formula $y=w^T x$. $x$ is a column vector using each of the explanatory variables as an element. $w$ is a column vector using, as an element, a coefficient that corresponds to each of the explanatory variables. Values of the elements of $w$ are determined in the supervised learning. An objective variable $y$ is a probability of a customer purchasing merchandise when the explanatory variables (in this example, the age of the customer and the price of the merchandise) are given. Stated another way, by substituting the age of a certain customer and the price of a certain piece of merchandise in $y=w^t x$, a probability of the certain customer purchasing the certain piece of merchandise is obtained.

However, there is a problem wherein the prediction model obtained as described above has a low accuracy of prediction. A reason for this is described. Even when records different from each other in master data have an identical attribute value, the records have potential characteristics different from each other in some cases. Assume, for example, that two records have an identical attribute value (age) of 20 years old in master data relating to customers. However, assume that a customer (customer A) that corresponds to one of the two records is an indoor person and a customer (customer B) that corresponds to the other of the two records is an outdoor person. Here, in general, a probability of customer A purchasing flip-flops of 980 yen is different from a probability of customer B purchasing the flip-flops of 980 yen in consideration of the tastes of the customers and merchandise (the flip-flops). However, the ages of customers A and B are identical. Therefore, values of explanatory variables at the time of obtaining the probability of customer A purchasing the flip-flops of 980 yen are 20 years old and 980 yen, and values of explanatory variables at the time of obtaining the probability of customer B purchasing the flip-flops of 980 yen are also 20 years old and 980 yen. Thus, regardless of which of the probabilities is to be obtained, the values of the explanatory variables are common, and an identical probability is derived. Stated another way, it cannot be said that the prediction mode obtained as described above grasps a difference in an actual purchase tendency, and the prediction model obtained as described above has a low accuracy of prediction.

The problem described above does not only arise in a case where the relationship between the customer ID and the merchandise ID is predicted.

Accordingly, it is an object of the present invention to provide a prediction model generation system, a prediction model generation method, and a prediction model generation program that are capable of generating a prediction model for accurately predicting a relationship between an ID of a record in first master data and an ID of a record in second master data.

Solution to Problem

A prediction model generation system according to the present invention includes: co-clustering means for performing co-clustering processing for performing co-clustering on first IDs and second IDs in accordance with first master data, second master data, and fact data indicating a relationship between each of the first IDs and each of the second IDs, each of the first IDs serving as an ID of a record in the first master data, each of the second IDs serving as an ID of a record in the second master data; prediction model generation means for performing prediction model generation processing for generating a prediction model for each combination of a first ID cluster and a second ID cluster, the prediction model using the relationship between each of the first IDs and each of the second IDs as an objective variable, the first ID cluster serving as a cluster of the first IDs, the second ID cluster serving as a cluster of the second IDs; and determination means for determining whether a prescribed condition is satisfied. The prediction model generation processing and the co-clustering processing are repeated until it is determined that the prescribed condition is satisfied. In determining a probability of a single first ID belonging to a single first ID cluster, the co-clustering means calculates a degree of an error between a results value and a predicted value of a relationship between the single first ID and each of the second IDs by using each of the prediction models that correspond to a combination of each of the second ID clusters and the single first ID cluster, and increases the probability as the degree of the error decreases. In determining a probability of a single second ID belonging to a single second ID cluster, the co-clustering means calculates a degree of an error between a results value and a predicted value of a relationship between the single second ID and each of the first IDs by using each of the prediction model that corresponds to a combination of each of the first ID clusters and the single second ID cluster, and increases the probability as the degree of the error decreases.

In addition, a prediction model generation method according to the present invention includes: performing co-clustering processing for performing co-clustering on first IDs and second IDs in accordance with first master data, second master data, and fact data indicating a relationship between each of the first IDs and each of the second IDs, each of the first IDs serving as an ID of a record in the first master data, each of the second IDs serving as an ID of a record in the second master data; performing prediction model generation processing for generating a prediction model for each combination of a first ID cluster and a second ID cluster, the prediction model using the relationship between each of the first IDs and each of the second IDs as an objective variable, the first ID cluster serving as a cluster of the first IDs, the second ID cluster serving as a cluster of the second IDs; determining whether a prescribed condition is satisfied; and repeating the prediction model generation processing and the co-clustering processing until it is determined that the prescribed condition is satisfied. In the co-clustering processing, when a probability of a single first ID belonging to a single first ID cluster is determined, a degree of an error is calculated between a results value and a predicted value of a relationship between the single first ID and each of the second IDs by using each of the prediction models that correspond to a combination of each of the second ID clusters and the single first ID cluster, and the probability is increased as the degree of the error decreases. When a probability of a single second ID belonging to a single second ID cluster is determined, a degree of an error is calculated between a results value and a predicted value of a relationship between the single second ID and each of the first IDs by using each of the prediction models that correspond to a combination of each of the first ID clusters and the single second ID cluster, and the probability is increased as the degree of the error decreases.

Further, a prediction model generation program according to the present invention causes a computer to execute a process including: performing co-clustering processing for performing co-clustering on first IDs and second IDs in accordance with first master data, second master data, and fact data indicating a relationship between each of the first IDs and each of the second IDs, each of the first IDs serving as an ID of a record in the first master data, each of the second IDs serving as an ID of a record in the second master data; performing prediction model generation processing for generating a prediction model for each combination of a first ID cluster and a second ID cluster, the prediction model using the relationship between each of the first IDs and each of the second IDs as an objective variable, the first ID cluster serving as a cluster of the first IDs, the second ID cluster serving as a cluster of the second IDs; performing determination processing for determining whether a prescribed condition is satisfied; and repeating the prediction model generation processing and the co-clustering processing until it is determined that the prescribed condition is satisfied. In the co-clustering processing, when a probability of a single first ID belonging to a single first ID cluster is determined, a degree of an error is calculated between a results value and a predicted value of a relationship between the single first ID and each of the second IDs by using each of the prediction models that correspond to a combination of each of the second ID clusters and the single first ID cluster, and the probability is increased as the degree of the error decreases. When a probability of a single second ID belonging to a single second ID cluster is determined, a degree of an error is calculated between a results value and a predicted value of a relationship between the single second ID and each of the first IDs by using each of the prediction models that correspond to a combination of each of the first ID clusters and the single second ID cluster, and the probability is increased as the degree of the error decreases.

Advantageous Effects of Invention

According to the present invention, a prediction model for accurately predicting a relationship between an ID of a record in first master data and an ID of a record in second master data can be generated.

BRIEF DESCRIPTION OF DRAWINGS

FIG. 1 It depicts an explanatory diagram illustrating an example of fact data expressed in a matrix form.

FIG. 3 It depicts a schematic diagram illustrating a prediction model that is determined for each combination of a first ID cluster and a second ID cluster.

FIG. 4 It depicts an exemplary diagram illustrating an example of a membership probability of each individual first ID belonging to each individual first ID cluster.

FIG. 7 It depicts a schematic diagram illustrating each individual prediction model that corresponds to a combination of each individual first ID cluster and the second ID cluster "2".

FIG. 18 It depicts an explanatory diagram illustrating an example of fact data.

FIG. 19 It depicts an exemplary diagram illustrating an example of data obtained by obtaining an outer join of pieces of master data.

DESCRIPTION OF EMBODIMENTS

Exemplary embodiments of the present invention are described below with reference to the drawings.

First, first master data, second master data, and fact data are given to a prediction model generation system of the present invention. The description below is provided under the assumption that one piece of fact data exists, but plural pieces of fact data may exist.

Each of the first master data and the second master data includes a plurality of records. An ID of a record in the first master data is referred to as a first ID. An ID of a record in the second master data is referred to as a second ID.

In each of the records in the first master data, the first ID is associated with an attribute value that corresponds to the first ID. Similarly, in each of the records in the second master data, the second ID is associated with an attribute value that corresponds to the second ID.

Figures 15, 16, 17:
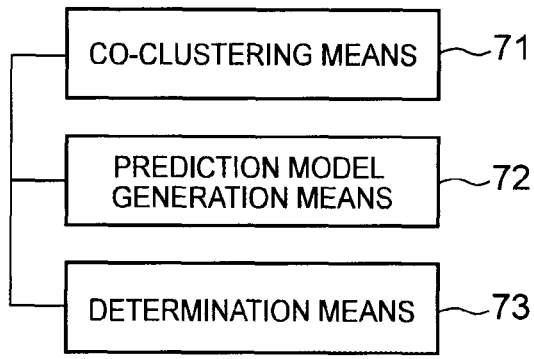
FIG. 15 It depicts a block diagram illustrating an outline of a prediction model generation system of the present invention.
FIG. 16 It depicts an exemplary diagram illustrating an example of master data relating to customers.
FIG. 17 It depicts an exemplary diagram illustrating an example of master data relating to merchandise.

The description below is provided by using, as an example, a case where the first master data is master data relating to customers, as illustrated in FIG. 16, and the second master data is master data relating to merchandise, as illustrated in FIG. 17. The description below is provided by using, as an example, a case where the first ID is a customer ID for identifying a customer, and the second ID is a merchandise ID for identifying merchandise. However, the first master data and the second master data are not limited to the master data relating to customers and the master data relating to merchandise. Accordingly, the first ID and the second ID are not limited to the customer ID and the merchandise ID, either.

In the master data illustrated in FIG. 16, a value of "age" is indicated as an attribute value that corresponds to the customer ID (the first ID). However, the type of an attribute indicated by the first master data may be different from age. In addition, in the master data illustrated in FIG. 17, a value of "price" is indicated as an attribute value that corresponds to the merchandise ID (the second ID). However, the type of an attribute indicated by the second master data may be different from a price. Further, the first master data and the second master data may indicate plural types of attributes.

The fact data is data indicating a relationship between the first ID and the second ID. The description below is provided by using, as an example, a case where the fact data indicates a relationship of whether there are results of a customer specified by a customer ID (a first ID) purchasing merchandise specified by a merchandise ID (a second ID). The fact data can be expressed as illustrated in FIG. 18. As already described, in the example depicted in FIG. 18, the presence of a record including a certain customer ID and a certain merchandise ID indicates the presence of results of a customer specified by the certain customer ID purchasing merchandise specified by the certain merchandise ID. In addition, the absence of a record including a certain customer ID and a certain merchandise ID indicates the absence of results of a customer specified by the certain customer ID purchasing merchandise specified by the certain merchandise ID. Further, the fact data illustrated in FIG. 18 may include, as a column, information indicating date and time when a customer purchased merchandise, information indicating a store where the customer purchased the merchandise, or other information.

Note that the fact data is not limited to data having the form illustrated in FIG. 18, and can also be expressed, for example, in a matrix form. FIG. 1 depicts an explanatory diagram illustrating an example of fact data expressed in a matrix form. In the fact data illustrated in FIG. 1, each row corresponds to the customer ID, and each column corresponds to the merchandise ID. The fact data illustrated in FIG. 1 also indicates, as a relationship between a first ID and a second ID, a relationship of whether there are results of a customer specified by a customer ID (the first ID) purchasing merchandise specified by a merchandise ID (the second ID). Specifically, in the fact data illustrated in FIG. 1, the presence of results of a customer purchasing merchandise is indicated by "1", and the absence of the results is indicated by "0". For example, this fact data indicates that there are results of a customer having the customer ID "1" purchasing merchandise having the merchandise ID "2". This fact data also indicates that there are no results of the customer having the customer ID "1" purchasing merchandise having the merchandise ID "1". Note that a value indicating the relationship between the first ID and the second ID is not limited to a binary value ("0" and "1"). For example, in fact data having the form depicted in FIG. 1, the number of pieces of merchandise that a customer has purchased may be indicated as the value indicating the relationship between the first ID and the second ID. The fact data illustrated in FIG. 1 or 18 can be referred to as purchase results data.

Exemplary Embodiment 1

Figure 2:
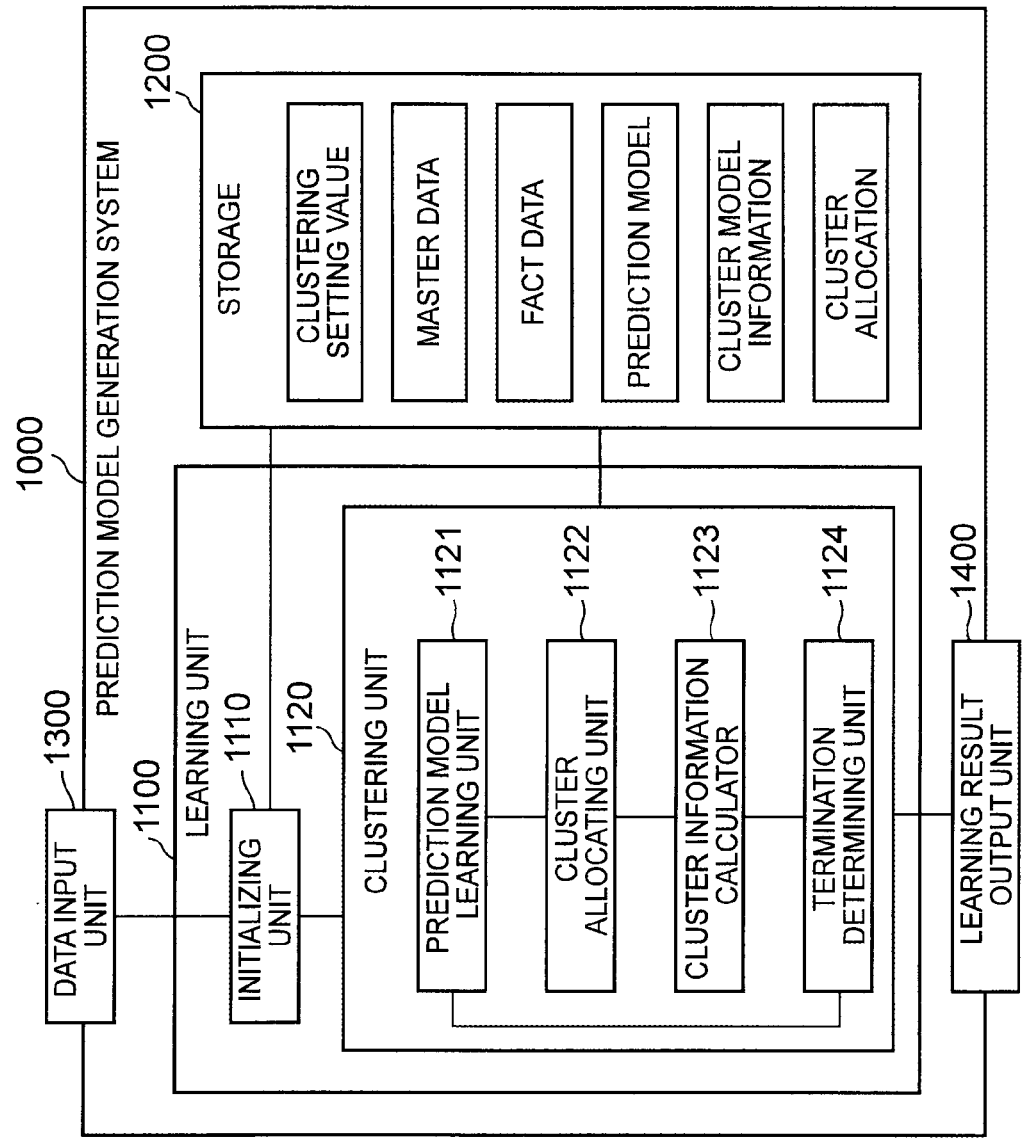
FIG. 2 It depicts a functional block diagram illustrating an example of a prediction model generation system according to a first exemplary embodiment of the present invention.

FIG. 2 depicts a functional block diagram illustrating an example of a prediction model generation system according to a first exemplary embodiment of the present invention.

A prediction model generation system 1000 according to the first exemplary embodiment includes a data input unit 1300, a learning unit 1100, a storage 1200, and a learning result output unit 1400. The learning unit 1100 includes an initializing unit 1110 and a clustering unit 1120. The clustering unit 1120 includes a prediction model learning unit 1121, a cluster allocating unit 1122, a cluster information calculator 1123, and a termination determining unit 1124.

The prediction model generation system 1000 performs co-clustering on first IDs and second IDs on the basis of first master data, second master data, and fact data that have been input. A cluster of the first IDs is referred to as a first ID cluster. In addition, a cluster of the second IDs is referred to as a second ID cluster. The first ID cluster can also be referred to as a customer ID cluster. Similarly, the second ID cluster can also be referred to as a merchandise ID cluster. A mode of clustering performed by the prediction model generation system 1000 is soft clustering. In addition, the prediction model generation system 1000 performs learning to generate a prediction model using a relationship between the first ID and the second ID as an objective variable for each combination of the first ID cluster and the second ID cluster. The prediction model generation system 1000 according to the present exemplary embodiment repeats prediction model generation processing, co-clustering processing, and the like until termination conditions are satisfied.

The data input unit 1300 obtains a data group to be used to generate the prediction model and setting values of clustering. For example, the data input unit 1300 may access an external device so as to obtain the data group and the setting values of clustering. Alternatively, the data input unit 1300 may be an input interface to which the data group and the setting values of clustering are input.

The data group to be used to generate the prediction model includes the first master data (for example, the master data relating to customers that is illustrated in FIG. 16), the second master data (for example, the master data relating to merchandise that is illustrated in FIG. 17), and the fact data (for example, the purchase results data illustrated in FIG. 18 or 1).

In addition, examples of the setting values of clustering include a maximum value of the number of first ID clusters, a maximum value of the number of second ID clusters, attribute names of attributes that correspond to the explanatory variables in the prediction model, an attribute that corresponds to the objective variable, and the type of the prediction model.

Examples of the attributes that correspond to the explanatory variables include an attribute indicated by the first master data and an attribute indicated by the second master data. In addition to the attribute indicated by the first master data and the attribute indicated by the second master data, an attribute indicated by the fact data (for example, date and time when a customer purchased merchandise, or a store where the customer purchased the merchandise) may be set as the setting values of clustering.

The attribute that corresponds to the objective variable is, for example, a probability of a customer specified by a customer ID purchasing merchandise specified by a merchandise ID. Note that the attribute that corresponds to the objective variable is not limited to this example. For example, the number of pieces of merchandise specified by a merchandise ID that a customer specified by a customer ID has purchased may be set as the objective variable. The present exemplary embodiment is described by using, as an example, a case where a value of the objective variable is a continuous value for simplification of description.

Examples of the type of the prediction model include a support vector machine, logistic regression, multinomial logit, and the like. Any of a variety of types is specified as the type of the prediction model.

The learning unit 1100 initializes cluster allocation and the like, and performs repetition processing for repeating prediction model generation processing, co-clustering processing, and the like. In the learning unit 1100, the initializing unit 1110 performs the initialization described above, and the clustering unit 1120 performs the repetition processing described above.

The initializing unit 1110 receives the first master data, the second master data, the fact data, and the setting values of clustering from the data input unit 1300, and stores them in the storage 1200.

The initializing unit 1110 also initializes cluster allocation. Specifically, the initializing unit 1110 determines an initial value of a probability of each individual first ID belonging to each individual first ID cluster and an initial value of a probability of each individual second ID belonging to each individual second ID cluster. Hereinafter, a probability of an ID belonging to a cluster is referred to as a membership probability. The initializing unit 1110 stores the respective determined initial values of the membership probabilities in the storage 1200.

Further, the initializing unit 1110 determines an initial value of cluster model information for each of the first ID clusters, and similarly determines an initial value of cluster model information for each of the second ID clusters. The initializing unit 1110 stores, in the storage 1200, the initial value of the cluster model information that has been determined for each of the clusters.

The cluster model information is information indicating a statistical characteristic of attribute values that correspond to IDs that belong to a cluster. Specifically, the cluster model information is a statistic of the attribute values that correspond to the IDs that belong to the cluster. For example, the cluster model information can be expressed by a mean value or a variance of the attribute values that correspond to the IDs that belong to the cluster. Assume that the annual income of a customer is included as an attribute value in master data relating to customers. In a case where the annual income is assumed to vary according to a normal distribution in each of the customer ID clusters, the cluster model information can be expressed by a mean value or a variance of the normal distribution of the annual income. For simplification of description, the description below is provided by using, as an example, a case where the cluster model information is a mean value of attribute values that correspond to IDs that belong to a cluster.

The clustering unit 1120 repeats prediction model generation processing, co-clustering processing, and the like until terminal conditions are satisfied so as to derive a clustering result of the first IDs and the merchandise IDs and a prediction model for each of the combinations of the first ID cluster and the second ID cluster.

The cluster model information is referred to when the cluster allocating unit 1122 performs clustering.

The prediction model learning unit 1121 performs learning so as to generate the prediction model for each of the combinations of the first ID cluster and the second ID cluster.

As described above, the prediction model is obtained, for example, in the form of the formula $y=w^t x$. $x$ is a column vector using each of the explanatory variables as an element. $w$ is a column vector using, as an element, a coefficient that corresponds to each of the explanatory variables. Here, a description is provided by using, as an example, a case where an objective variable $y$ is a probability of a customer specified by a customer ID purchasing merchandise specified by a merchandise ID. In addition, a description is provided by using, as an example, a case where the exemplary variables serving as elements of the column vector $x$ are the age of a customer and the price of merchandise. The exemplary variables and the objective variable are determined in advance as the setting values of clustering. Thus, the generation of the prediction model means the determination of the column vector $w$.

FIG. 3 depicts a schematic diagram illustrating a prediction model that is determined for each of the combinations of the first ID cluster and the second ID cluster. In FIG. 3, the prediction model is indicated by the column vector $w$. In addition, a first subscript of $w$ is an identification number of the customer ID cluster (the first ID cluster). A second subscript of $w$ is an identification number of the merchandise ID cluster (the second ID cluster). "Outdoor person", "outdoor goods", and the like are assumed to be labels that have been given by a system administrator for convenience. In the example depicted in FIG. 3, each of the number of customer ID clusters and the number of merchandise ID clusters is 3, and therefore 9 (=3×3) prediction models are schematically illustrated.

In addition, at a point in time at which the prediction model learning unit 1121 generates the respective prediction models, a membership probability of each individual first ID belonging to each individual first ID cluster and a membership probability of each individual second ID belonging to each individual second ID cluster have been stored in the storage 1200.

FIG. 4 depicts an exemplary diagram illustrating an example of a membership probability of each individual first ID belonging to each individual first ID cluster. As depicted in FIG. 4, a membership probability of the first ID "1" is determined for each of the first ID clusters. The similar is applied to another first ID.

Figures 5, 6:
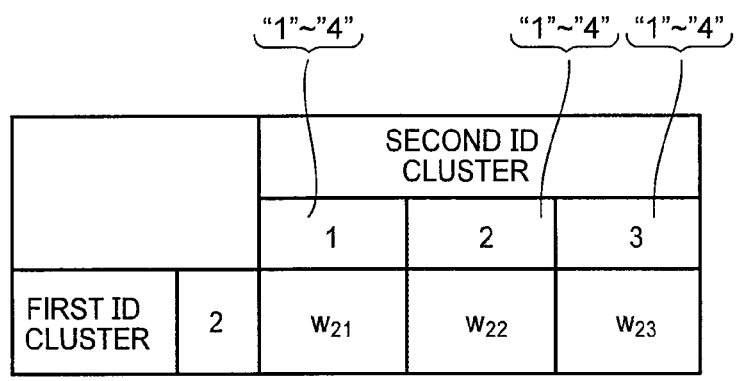
FIG. 5 It depicts an exemplary diagram illustrating an example of a membership probability of each individual second ID belonging to each individual second ID cluster.
FIG. 6 It depicts a schematic diagram illustrating each individual prediction model that corresponds to a combination of each individual second ID cluster and the first ID cluster "2".

FIG. 5 depicts an exemplary diagram illustrating an example of a membership probability of each individual second ID belonging to each individual second ID cluster. As depicted in FIG. 5, a membership probability of the second ID "1" is determined for each of the second ID clusters. The similar is applied to another second ID.

Processing in which the prediction model learning unit 1121 generates the prediction model is described by using, as an example, a case where the prediction model learning unit 1121 generates a prediction model that corresponds to a combination of the first ID cluster "1" and the second ID cluster "2". Here, the first ID cluster "1" and the second ID cluster "2" that correspond to a prediction model to be generated are respectively referred to as a first ID cluster of interest and a second ID cluster of interest. Assume that, for each of the combinations of the first ID and the second ID, a predicted value is obtained by substituting attribute values for the explanatory variables, a value is obtained by multiplying the predicted value by a membership probability of the first ID belonging to the first ID cluster of interest and a membership probability of the second ID belonging to the second ID cluster of interest, and a difference is obtained between the value and a results value of the objective variable. In this case, the prediction model learning unit 1121 determines column vector $w_{12}$ in the prediction model in such a way that the sum of the differences becomes minimum. The determination of column vector $w_{12}$ is a synonym of the generation of the prediction model. The results value of the objective variable, in this example, is "1" when a customer has purchased merchandise, and the results value of the objective variable is "0" when the customer has not purchased merchandise.

More specifically, the prediction model learning unit 1121 determines column vector $w_{12}$ by which Formula (1) described below has a minimum value.

[Formula 1]

$$\sum_{d_1}\sum_{d_2}(y_{d_1 d_2} - w_{12}^T x_{d_1 d_2} \cdot q(z_{d_1} = 1) \cdot q(z_{d_2} = 2)) \quad (1)$$

In Formula (1), $d_1$ is a variable that indicates the order of the first ID. $d_2$ is a variable that indicates the order of the second ID. $y_{d_1 d_2}$ is a results value that indicates whether a customer specified by a $d_1$-th first ID has purchased merchandise specified by a $d_2$-th second ID. $x_{d_1 d_2}$ is a column vector obtained by substituting attribute values that correspond to the $d_1$-th first ID and the $d_2$-th second ID for the explanatory variables. $q(z_{d1}=1)$ is a membership probability of the $d_1$-th first ID belonging to the first ID cluster "1" of interest, and $q(z_{d2}=2)$ is a membership probability of the $d_2$-th second ID belonging to the second ID cluster "2" of interest.

Assume that, for each of the combinations of the first ID and the second ID, a predicted value is obtained by substituting attribute values for the explanatory variables, a value is obtained by multiplying the predicted value by the membership probability $q(z_{d1}=1)$ of the first ID belonging to the first ID cluster of interest and the membership probability $q(z_{d2}=2)$ of the second ID belonging to the second ID cluster of interest, and a difference is obtained between the value and the results value $y_{d1d2}$ of the objective variable. In this case, Formula (1) indicates the sum of the differences.

The prediction model learning unit 1121 determines column vector $w_{12}$ by which Formula (1) has a minimum value so as to generate a prediction model that corresponds to a combination of the first ID cluster "1" and the second ID cluster "2".

The prediction model learning unit 1121 similarly generates a prediction model that corresponds to a combination of another first ID cluster and another second ID cluster.

The prediction model learning unit 1121 stores, in the storage 1200, prediction models generated for the respective combinations of the first ID cluster and the second ID cluster. In a case where the respective prediction models have been stored in the storage 1200, the prediction model learning unit 1121 updates the respective prediction models to respective newly generated prediction models.

The magnitude of an influence of each piece of purchase results on a prediction model is proportional to a membership probability of an ID of a customer relating to the purchase results belonging to a first ID cluster of interest and a membership probability of an ID of merchandise relating to the purchase results belonging to a second ID cluster of interest.

The cluster allocating unit 1122 performs co-clustering on first IDs and second IDs on the basis of first master data, second master data, and fact data. A mode of clustering is soft clustering. Accordingly, the cluster allocating unit 1122 determines a membership probability of a certain first ID belonging to each of the first ID clusters. The similar is applied to another first ID. In addition, the cluster allocating unit 1122 determines a membership probability of a certain second ID belonging to each of the second ID clusters. The similar is applied to another second ID.

A set of first IDs is referred to as $\{x_{d1}\}_{d1=1}^{D1}$. $D_1$ is the number of first IDs. $\{x_{d1}\}_{d1=1}^{D1}$ means a set including 1st to $D_1$-th first IDs. A set of second IDs is referred to as $\{x_{d2}\}_{d2=1}^{D2}$. $D_2$ is the number of second IDs. $\{x_{d2}\}_{d2=1}^{D2}$ means a set including 1st to $D_2$-th second IDs. The cluster allocating unit 1122 performs clustering on $\{x_{d1}\}_{d1=1}^{D1}$ so as to form $K_1$ first ID clusters, and performs clustering on $\{x_{d2}\}_{d2=1}^{D2}$ so as to form $K_2$ second ID clusters.

In addition, a membership probability of a $d_1$-th first ID belonging to the first ID cluster "$k_1$" is referred to as $q(z_{d1}=k_1)$. A membership probability of a $d_2$-th second ID belonging to the second ID cluster "$k_2$" is referred to as $q(z_{d2}=k_2)$.

In determining a membership probability of a single first ID belonging to a single first ID cluster, the cluster allocating unit 1122 increases the membership probability as a difference between an attribute value of the single first ID and cluster model information that corresponds to the single first ID cluster (in other words, a statistic of attribute values in the single first ID cluster) decreases, and the cluster allocating unit 1122 reduces the membership probability as the difference increases.

Similarly, in determining a membership probability of a single second ID belonging to a single second ID cluster, the cluster allocating unit 1122 increases the membership probability as a difference between an attribute value of the single second ID and cluster model information that corresponds to the single second ID cluster decreases, and the cluster allocating unit 1122 reduces the membership probability as the difference increases.

Here, a description is provided under the assumption that cluster model information is a mean value of attribute values that correspond to IDs that belong to a cluster.

For example, in determining a membership probability of the first ID "1" belonging to the first ID cluster "2", the cluster allocating unit 1122 increases the membership probability as an age that corresponds to the first ID "1" becomes closer to a mean value of ages in the first ID cluster "2", and the cluster allocating unit 1122 reduces the membership probability as the age is separated farther from the mean value.

In addition, for example, in determining a membership probability of the second ID "1" belonging to the second ID cluster "2", the cluster allocating unit 1122 increases the membership probability as a price that corresponds to the second ID "1" becomes closer to a mean value of prices in the second ID cluster "2", and the cluster allocating unit 1122 reduces the membership probability as the price is separated farther from the mean value.

A description has been provided here by using, as an example, the membership probability of the first ID "1" belonging to the first ID cluster "2" and the membership probability of the second ID "1" belonging to the second ID cluster "2". The similar is applied to a case where another membership probability is determined.

Further, the cluster allocating unit 1122 determines the membership probability in consideration of an error of a predicted value due to a prediction model in addition to the cluster model information.

In determining a membership probability of a single first ID belonging to a single first ID cluster, the cluster allocating unit 1122 calculates a degree of an error between a results value and a predicted value of a relationship between the single first ID and each of the second IDs by using each individual prediction model that corresponds to a combination of each individual second ID cluster and the single first ID cluster. Then, the cluster allocating unit 1122 increases the membership probability as the degree of the error decreases, and the cluster allocating unit 1122 reduces the membership probability as the degree of the error increases.

Here, a description is provided by using, as an example, a case where a membership probability of the first ID "1" belonging to the first ID cluster "2" is determined. FIG. 6 depicts a schematic diagram illustrating each individual prediction model that corresponds to a combination of each individual second ID cluster and the first ID cluster "2". Assume that the number of second ID clusters is 3 and the number of second IDs is 4. In addition, a membership probability of each of the second IDs "1" to "4" has been set with respect to the individual second ID clusters "1", "2", and "3". Stated another way, it can be said that each of the second IDs "1" to "4" belongs to all of the individual second ID clusters "1", "2", and "3" at a certain membership probability. In addition, $w_{21}$, $w_{22}$, or $w_{23}$ is a column vector included in a formula that corresponds to the prediction model, but the reference sign $w_{21}$ or the like is used here as identification information of the prediction model, for convenience.

The cluster allocating unit 1122 applies an attribute value of the first ID "1" and an attribute value of the second ID "1" to the prediction model "$w_{21}$" so as to obtain a value of the objective variable y. Stated another way, the cluster allocating unit 1122 calculates a predicted value of a relationship between the first ID "1" and the second ID "1". Then, the cluster allocating unit 1122 calculates a difference between a results value of the relationship between the first ID "1" and the second ID "1" and the predicted value. It is sufficient if the cluster allocating unit 1122 reads the results value from the fact data. Here, a second ID cluster that corresponds to the prediction model "$w_{21}$" is the second ID cluster "1". The cluster allocating unit 1122 multiplies the difference between the results value and the predicted value by a membership probability of the second ID "1" belonging to the second ID cluster "1". Stated another way, the cluster allocating unit 1122 calculates the product of the difference between the results value and the predicted value and the membership probability. This membership probability is a probability of a second ID belonging to a second ID cluster that corresponds to a prediction model being referred to. The cluster allocating unit 1122 similarly calculates each of the product of a difference between a predicted value and an actual measurement value of a relationship between the first ID "1" and the second ID "2" and a membership probability, the product of a difference between a predicted value and an actual measurement value of a relationship between the first ID "1" and the second ID "3" and a membership probability, and the product of a difference between a predicted value and an actual measurement value of a relationship between the first ID "1" and the second ID "4" and a membership probability, by using the prediction model "$w_{21}$".

Similarly, the cluster allocating unit 1122 calculates each of the product of a difference between a predicted value and an actual measurement value of a relationship between the first ID "1" and the second ID "1" and a membership probability, the product of a difference between a predicted value and an actual measurement value of a relationship between the first ID "1" and the second ID "2" and a membership probability, the product of a difference between a predicted value and an actual measurement value of a relationship between the first ID "1" and the second ID "3" and a membership probability, and the product of a difference between a predicted value and an actual measurement value of a relationship between the first ID "1" and the second ID "4" and a membership probability, by using the prediction model "$w_{22}$". In addition, the cluster allocating unit 1122 calculates each of the product of a difference between a predicted value and an actual measurement value of a relationship between the first ID "1" and the second ID "1" and a membership probability, the product of a difference between a predicted value and an actual measurement value of a relationship between the first ID "1" and the second ID "2" and a membership probability, the product of a difference between a predicted value and an actual measurement value of a relationship between the first ID "1" and the second ID "3" and a membership probability, and the product of a difference between a predicted value and an actual measurement value of a relationship between the first ID "1" and the second ID "4" and a membership probability, by using the prediction model "$w_{23}$".

Stated another way, the cluster allocating unit 1122 calculates the product of a difference between a predicted value and an actual measurement value and a membership probability for each individual second ID in each individual second ID cluster.

The cluster allocating unit 1122 calculates the sum of the individual products obtained as described above, and determines a value of the sum as the degree of the error described above (a degree of an error between a results value and a predicted value of a relationship between a first ID and each of the second IDs). Then, the cluster allocating unit 1122 increases the membership probability of the first ID "1" belonging to the first ID cluster "2" as the degree of the error decreases, and the cluster allocating unit 1122 reduces the membership probability as the degree of the error increases.

A description has been provided here by using, as an example, a case where the membership probability of the first ID "1" belonging to the first ID cluster "2" is determined. The similar is applied to an operation in a case where another membership probability is determined.

In addition, in determining a membership probability of a single second ID belonging to a single second ID cluster, the cluster allocating unit 1122 calculates a degree of an error between a results value and a predicted value of a relationship between the single second ID and each of the first IDs by using each individual prediction model that corresponds to a combination of each individual first ID cluster and the single second ID cluster. Then, the cluster allocating unit 1122 increases the membership probability as the degree of the error decreases, and the cluster allocating unit 1122 reduces the membership probability as the degree of the error increases.

Here, a description is provided by using, as an example, a case where a membership probability of the second ID "1" belonging to the second ID cluster "2" is determined. FIG. 7 depicts a schematic diagram illustrating each individual prediction model that corresponds to a combination of each individual first ID cluster and the second ID cluster "2". Assume that the number of first ID clusters is 3 and the number of first IDs is 4. In addition, a membership probability of each of the first IDs "1" to "4" has been set with respect to the individual first ID clusters "1", "2", and "3". Stated another way, it can be said that each of the first IDs "1" to "4" belongs to all of the individual first ID clusters "1", "2", and "3" at a certain membership probability. In addition, $w_{12}$, $w_{22}$, or $w_{32}$ is a column vector included in a formula that corresponds to the prediction model, but the reference sign $w_{12}$ or the like is used here as identification information of the prediction model, for convenience.

The cluster allocating unit 1122 applies an attribute value of the second ID "1" and an attribute value of the first ID "1" to the prediction model "$w_{12}$" so as to obtain a value of the objective variable y. Stated another way, the cluster allocating unit 1122 calculates a predicted value of a relationship between the second ID "1" and the first ID "1". Then, the cluster allocating unit 1122 calculates a difference between a results value of the relationship between the second ID "1" and the first ID "1" and the predicted value. It is sufficient if the cluster allocating unit 1122 reads the results value from the fact data. Here, a first ID cluster that corresponds to the prediction model "$w_{12}$" is the first ID cluster "1". The cluster allocating unit 1122 multiplies the difference between the results value and the predicted value by a membership probability of the first ID "1" belonging to the first ID cluster "1". Stated another way, the cluster allocating unit 1122 calculates the product of the difference between the results value and the predicted value and the membership probability. This membership probability is a probability of a first ID belonging to a first ID cluster that corresponds to a prediction model being referred to. The cluster allocating unit 1122 similarly calculates each of the product of a difference between a predicted value and an actual measurement value of a relationship between the second ID "1" and the first ID "2" and a membership probability, the product of a difference between a predicted value and an actual measurement value of a relationship between the second ID "1" and the first ID "3" and a membership probability, and the product of a difference between a predicted value and an actual measurement value of a relationship between the second ID "1" and the first ID "4" and a membership probability, by using the prediction model "$w_{12}$".

Similarly, the cluster allocating unit 1122 calculates each of the product of a difference between a predicted value and an actual measurement value of a relationship between the second ID "1" and the first ID "1" and a membership probability, the product of a difference between a predicted value and an actual measurement value of a relationship between the second ID "1" and the first ID "2" and a membership probability, the product of a difference between a predicted value and an actual measurement value of a relationship between the second ID "1" and the first ID "3" and a membership probability, and the product of a difference between a predicted value and an actual measurement value of a relationship between the second ID "1" and the first ID "4" and a membership probability, by using the prediction model "$w_{22}$". In addition, the cluster allocating unit 1122 calculates each of the product of a difference between a predicted value and an actual measurement value of a relationship between the second ID "1" and the first ID "1" and a membership probability, the product of a difference between a predicted value and an actual measurement value of a relationship between the second ID "1" and the first ID "2" and a membership probability, the product of a difference between a predicted value and an actual measurement value of a relationship between the second ID "1" and the first ID "3" and a membership probability, and the product of a difference between a predicted value and an actual measurement value of a relationship between the second ID "1" and the first ID "4" and a membership probability, by using the prediction model "$w_{32}$".

Stated another way, the cluster allocating unit 1122 calculates the product of a difference between a predicted value and an actual measurement value and a membership probability for each individual first ID in each individual first ID cluster.

The cluster allocating unit 1122 calculates the sum of the individual products obtained as described above, and determines a value of the sum as the degree of the error described above (a degree of an error between a results value and a predicted value of a relationship between a second ID and each of the first IDs). Then, the cluster allocating unit 1122 increases the membership probability of the second ID "1" belonging to the second ID cluster "2" as the degree of the error decreases, and the cluster allocating unit 1122 reduces the membership probability as the degree of the error increases.

The cluster allocating unit 1122 updates each of the membership probabilities stored in the storage 1200 to the determined membership probability.

The cluster information calculator 1123 refers to cluster allocation of each of the first IDs and each of the second IDs (namely, a membership probability of each individual first ID belonging to each individual first ID cluster and a membership probability of each individual second ID belonging to each individual second ID cluster), calculates cluster model information for each of the first ID clusters, and calculates cluster model information for each of the second ID clusters. As already described, the cluster model information is information indicating a statistical characteristic of attribute values that correspond to IDs that belong to a cluster. A method for calculating the cluster model information is described below by using, as an example, a case where a mean value of attribute values is used as the cluster model information.

In the case of calculating the cluster model information with respect to a first ID cluster, the cluster information calculator 1123 calculates, for each of the first IDs that belong to a first ID cluster of interest, the product of an attribute value and a membership probability of the first ID belonging to the first ID cluster of interest, and further obtains the sum of the products. Assume that this value is A. In addition, the cluster information calculator 1123 calculates a value obtained by adding 1 to the sum of membership probabilities of the respective first IDs belonging to the first ID cluster of interest. Assume that this value is B. The cluster information calculator 1123 determines a value obtained by dividing A by B as cluster model information in the first ID cluster of interest. Specifically, the cluster information calculator 1123 performs calculation according to Formula (2) described below.

[Formula 2]

$$\text{Cluster model information} = \frac{\sum_{d_1}\left(\text{attribute value}_{d_1} \times \text{membership probability}_{d_1}\right)}{1 + \sum_{d_1} \text{membership probability}_{d_1}} \quad (2)$$

In Formula (2), "attribute value$_{d_1}$" is an attribute value of a $d_1$-th first ID. "Membership probability$_{d_1}$" is a membership probability of the $d_1$-th first ID belonging to a first ID cluster of interest. "A" described above corresponds to a numerator of Formula (2), and "B" described above corresponds to a denominator of Formula (2).

The cluster information calculator 1123 calculates cluster model information for each of the first ID clusters according to Formula (2).

The similar is applied to a method for calculating cluster model information with respect to a second ID cluster. Stated another way, in the case of calculating the cluster model information with respect to the second ID cluster, the cluster information calculator 1123 calculates, for each of the second IDs that belong to a second ID cluster of interest, the product of an attribute value and a membership probability of the second ID belonging to the second ID cluster of interest, and further obtains the sum of the products. Assume that this value is C. In addition, the cluster information calculator 1123 calculates a value obtained by adding 1 to the sum of membership probabilities of the respective second IDs belonging to the second ID cluster of interest. Assume that this value is D. The cluster information calculator 1123 determines a value obtained by dividing C by D as cluster model information in the second ID cluster of interest. Specifically, the cluster information calculator 1123 performs calculation according to Formula (3) described below.

[Formula 3]

$$\text{Cluster model information} = \frac{\sum_{d_2}(\text{attribute value}_{d_2} \times \text{membership probability}_{d_2})}{1 + \sum_{d_2} \text{membership probability}_{d_2}} \quad (3)$$

In Formula (3), "attribute value$_{d2}$" is an attribute value of a $d_2$-th second ID. "Membership probability$_{d2}$" is a membership probability of the $d_2$-th second ID belonging to a second ID cluster of interest. "C" described above corresponds to a numerator of Formula (3), and "D" described above corresponds to a denominator of Formula (3).

The cluster information calculator 1123 calculates cluster model information for each of the second ID clusters according to Formula (3).

Note that the reason why 1 is added in the denominator of Formula (2) and the denominator of Formula (3) is that division is enabled, for example, even when all of the membership probabilities of the respective IDs are 0.

In addition, Formula (2) and Formula (3) are examples of a formula for calculating the cluster model information, and the formula for calculating the cluster model information is not limited to Formula (2) and Formula (3).

The cluster information calculator 1123 updates cluster model information stored in the storage 1200 to the newly calculated cluster model information.

The clustering unit 1120 repeats processing performed by the prediction model learning unit 1121, processing performed by the cluster allocating unit 1122, and processing performed by the cluster information calculator 1123.

The termination determining unit 1124 determines whether the repetition of a series of processing described above will be terminated. In a case where termination conditions are satisfied, the termination determining unit 1124 determines that the repetition of the series of processing described above will be terminated. In a case where the termination conditions are not satisfied, the termination determining unit 1124 determines that the repetition will be continued. An example of the termination conditions is described below.

For example, the number of times of the repetition of the series of processing described above may be set as one of the setting values of clustering. The termination determining unit 1124 may determine that the repetition will be terminated when the number of times of the repetition of the series of processing described above reaches a determined number.

In addition, when performing clustering, the cluster allocating unit 1122 may derive the accuracy of clustering and may store the accuracy of clustering in the storage 1200. The termination determining unit 1124 may calculate an amount of change from the previously derived accuracy of clustering to the most recently derived accuracy of clustering, and may determine that the repetition will be terminated if the amount of change is small (specifically, if an absolute value of the amount of change is less than or equal to a prescribed threshold). The cluster allocating unit 1122 may calculate, for example, a log-likelihood or a pseudo F of a model of clustering as the accuracy of clustering.

The storage 1200 is a storage device that stores various types of data obtained by the data input unit 1300 or various types of data obtained in processing performed by the learning unit 1100. The storage 1200 may be a principal storage device or a secondary storage device of a computer. In a case where the storage 1200 is the secondary storage device, the clustering unit 1120 can interrupt processing in the middle, and can restart the processing later. In addition, the storage 1200 may be configured to be divided into the principal storage device and the secondary storage device, and the learning unit 1100 may store a portion of data in the principal storage device and may store another portion of the data in the secondary storage device.

The learning result output unit 1400 outputs a result of processing performed by the clustering unit 1120 that has been stored in the storage 1200 (a final result of processing that has been established due to the satisfaction of the terminal conditions). The learning result output unit 1400 outputs, for example, the number of clusters (the number of first ID clusters and the number of second ID clusters), a membership probability of each of the first IDs belonging to each individual first ID cluster, a membership probability of each of the second IDs belonging to each individual second ID cluster, and a prediction model obtained for each combination of the first ID cluster and the second ID cluster. In addition, the learning result output unit 1400 may output a time period required for learning, or the like.

A mode of the learning result output unit 1400 outputting the result is not particularly limited. For example, the learning result output unit 1400 may output the result to another device. Alternatively, for example, the learning result output unit 1400 may display the result on a display device.

The clustering unit 1120 including the prediction model learning unit 1121, the cluster allocating unit 1122, the cluster information calculator 1123, and the termination determining unit 1124, the data input unit 1300, the initializing unit 1110, and the learning result output unit 1400 are implemented by, for example, a central processing unit (CPU) of a computer that operates according to a program (a prediction model generation program). In this case, it is sufficient if the CPU reads the program, for example, from a program recording medium such as a program storage device (not depicted in FIG. 2) of the computer and operates as the data input unit 1300, the initializing unit 1110, the clustering unit 1120, and the learning result output unit 1400 in accordance with the program.

In addition, each of the elements of the prediction model generation system 1000 depicted in FIG. 2 may be implemented by dedicated hardware.

Further, the prediction model generation system of the present invention may have a configuration in which two or more apparatuses that are physically separated from each other are connected by wire or wirelessly. This is similarly applied to the exemplary embodiments described later.

Figure 8:
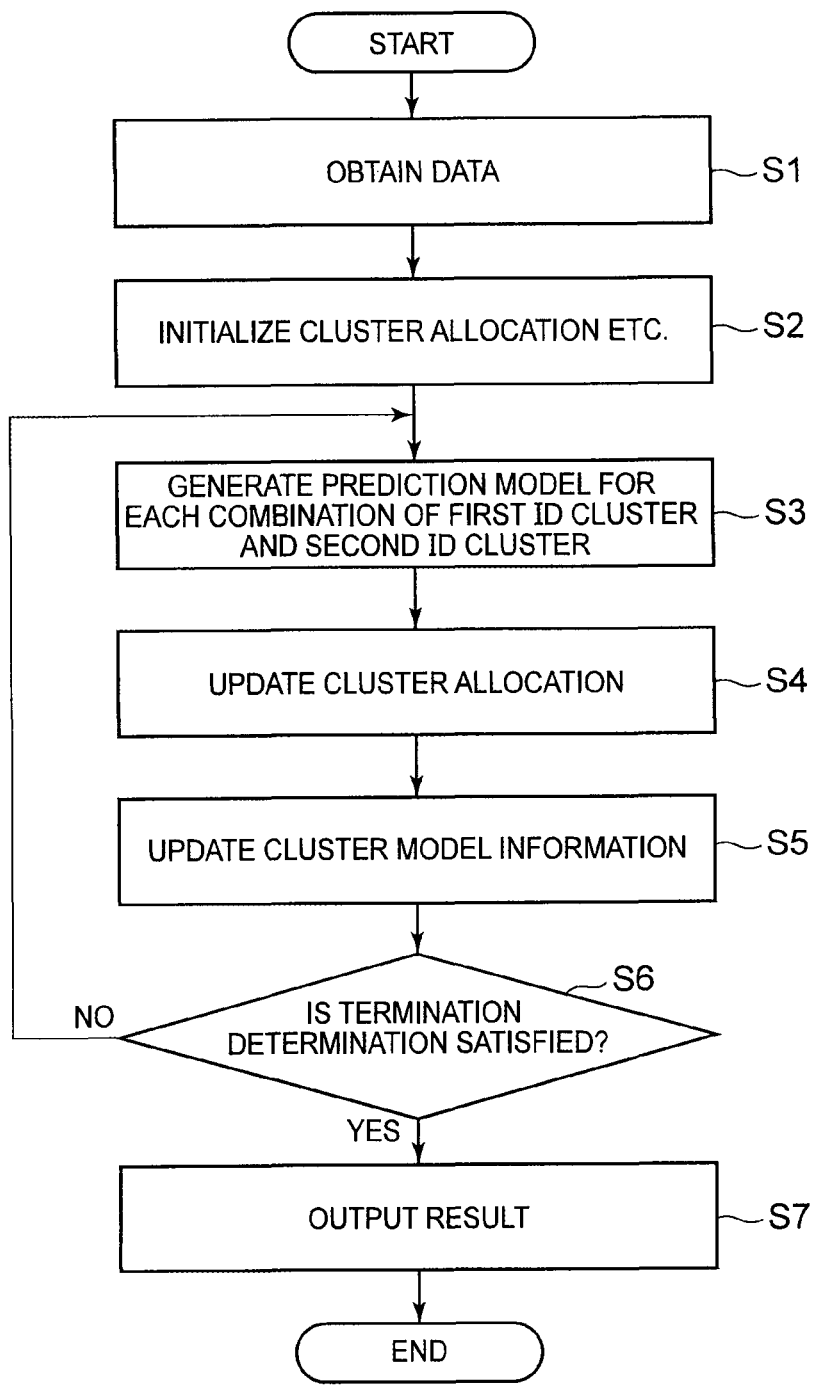
FIG. 8 It depicts a flowchart illustrating an example of a processing progress according to the first exemplary embodiment.

Next, a processing progress according to the first exemplary embodiment is described. FIG. 8 depicts a flowchart illustrating an example of the processing progress according to the first exemplary embodiment.

The data input unit 1300 obtains a data group (the first master data, the second master data, and the fact data) that is used to generate a prediction model and setting values of clustering (step S1). Examples of the setting values of clustering include a maximum value of the number of first ID clusters, a maximum value of the number of second ID clusters, attribute names of attributes that correspond to the explanatory variables in the prediction model, an attribute that corresponds to the objective variable, and the type of the prediction model.

The initializing unit 1110 stores, in the storage 1200, the first master data, the second master data, the fact data, and the setting values of clustering that the data input unit 1300 has obtained. Further, the initializing unit 1110 initializes cluster allocation and cluster model information (step S2).

In step S2, the initializing unit 1110 determines an initial value of a membership probability of each individual first ID belonging to each individual first ID cluster and an initial value of a membership probability of each individual second ID belonging to each individual second ID cluster, and stores the initial values in the storage 1200. The initializing unit 1110 may set the membership probabilities to be uniform. For example, in a case where the number of first ID clusters is 2, a membership probability of each of the first IDs belonging to a 1st first ID cluster and a membership probability of each of the first IDs belonging to a 2nd first ID cluster may be set to 0.5. The similar is applied to a membership probability of each of the second IDs. In addition, the initializing unit 1110 may set the initial values of the membership probabilities at random.

Further, the initializing unit 1110 determines an initial value of cluster model information for each of the first ID clusters, determines an initial value of cluster model information for each of the second ID clusters, and stores the respective initial values in the storage 1200. At this time, the initializing unit 1110 may calculate a mean value of attribute values in the first master data, and may set the mean value as cluster model information in individual first ID clusters. Similarly, the initializing unit 1110 may calculate a mean value of attribute values in the second master data, and may set the mean value as cluster model information in each individual second ID cluster.

After step S2, the clustering unit 1120 repeats the processes of steps S3 to S6 until the termination conditions are satisfied. The processes of steps S3 to S6 are described below.

The prediction model learning unit 1121 refers to information stored in the storage 1200, generates a prediction model for each of the combinations of the first ID cluster and the second ID cluster, and stores the respective prediction models in the storage 1200 (step S3). Processing for generating the prediction model has already been described, and a description is omitted here. In a case where the processing moves on to step S3 for the first time, it is sufficient if the prediction model learning unit 1121 stores the respective generated prediction models in the storage 1200. At a second time and subsequent times of step S3, the prediction model learning unit 1121 updates the respective prediction models stored in the storage 1200 to respective newly generated prediction models.

After step S3, the cluster allocating unit 1122 performs co-clustering on the first IDs and the second IDs on the basis of the first master data, the second master data, and the fact data (step S4). Specifically, the cluster allocating unit 1122 determines a membership probability of each individual first ID belonging to each individual first ID cluster and a membership probability of each individual second ID belonging to each individual second ID cluster. Then, the cluster allocating unit 1122 updates respective membership probabilities stored in the storage 1200 to the respective determined membership probabilities.

In step S4, in determining a membership probability of a single first ID belonging to a single first ID cluster, the cluster allocating unit 1122 increases the membership probability as a difference between an attribute value of the single first ID and cluster model information that corresponds to the single first ID cluster decreases, and the cluster allocating unit 1122 reduces the membership probability as the difference increases.

Similarly, in determining a membership probability of a single second ID belonging to a single second ID cluster, the cluster allocating unit 1122 increases the membership probability as a difference between an attribute value of the single second ID and cluster model information that corresponds to the single second ID cluster decreases, and the cluster allocating unit 1122 reduces the membership probability as the difference increases.

In addition, in determining a membership probability of a single first ID belonging to a single first ID cluster, the cluster allocating unit 1122 calculates a degree of an error between a results value and a predicted value of a relationship between the single first ID and each of the second IDs by using each individual prediction model that corresponds to a combination of each individual second ID cluster and the single first ID cluster. Then, the cluster allocating unit 1122 increases the membership probability as the degree of the error decreases, and the cluster allocating unit 1122 reduces the membership probability as the degree of the error increases.

Similarly, in determining a membership probability of a single second ID belonging to a single second ID cluster, the cluster allocating unit 1122 calculates a degree of an error between a results value and a predicted value of a relationship between the single second ID and each of the first IDs by using each individual prediction model that corresponds to a combination of each individual first ID cluster and the single second ID cluster. Then, the cluster allocating unit 1122 increases the membership probability as the degree of the error decreases, and the cluster allocating unit 1122 reduces the membership probability as the degree of the error increases.

After step S4, the cluster information calculator 1123 calculates cluster model information for each of the first ID clusters, and calculates cluster model information for each of the first ID clusters. Then, the cluster information calculator 1123 updates cluster model information stored in the storage 1200 to the newly calculated cluster model information (step S5).

Next, the termination determining unit 1124 determines whether the termination conditions are satisfied (step S6). In a case where the termination conditions are not satisfied (No in step S6), the termination determining unit 1124 determines that steps S3 to S6 will be repeated. Then, the clustering unit 1120 performs steps S3 to S6 again.

In a case where the termination conditions are satisfied (Yes in step S6), the termination determining unit 1124 determines that the repetition of steps S3 to S6 will be terminated. In this case, the learning result output unit 1400 outputs a result at this point in time of processing performed by the clustering unit 1120 (step S7).

According to the present exemplary embodiment, the cluster allocating unit 1122 performs co-clustering on the first IDs (the customer IDs) and the second IDs (the merchandise IDs) on the basis of the first master data, the second master data, and the fact data. Accordingly, a tendency indicated by the fact data (in this example, a purchase tendency at a time when a customer purchases merchandise) is reflected in a clustering result. Thus, even when a potential characteristic of the customer or a potential characteristic of the merchandise is not clarified in the master data, membership probabilities of respective IDs having a common potential characteristic increase in a specified cluster. For example, a membership probability of a customer ID of each of the customers having the potential characteristic "outdoor person" belonging to the customer ID cluster "1" increases, and a membership probability of a customer ID of each of the customers that do not have the characteristic above belonging to the customer ID cluster "1" decreases. In other words, customer IDs of customers having a common characteristic are collected into a specified customer ID cluster. The similar is applied to another customer ID cluster. Accordingly, it can be said that customer IDs of respective customers having a common characteristic are collected into each individual customer ID cluster and the common characteristic changes in each of the customer ID clusters. Similarly, it can be said that merchandise IDs of respective pieces of merchandise having a common characteristic are collected into each individual merchandise ID cluster and the common characteristic changes in each of the merchandise ID clusters. Then, the prediction model learning unit 1121 generates a prediction model for each of the combinations of the customer ID cluster (the first ID cluster) and the merchandise ID cluster (the second ID cluster). Accordingly, each individual prediction model reflects the potential characteristics of a customer and merchandise. Thus, the accuracy of prediction increases in a case where a relationship between the customer ID (the first ID) and the merchandise ID (the second ID) is predicted by using these prediction models. Accordingly, according to the present exemplary embodiment, a prediction model that enables the accurate prediction of a relationship between the first ID and the second ID can be generated.

In the present exemplary embodiment, the cluster allocating unit 1122 determines a membership probability in consideration of a difference between an attribute value of an ID and cluster model information. Further, the cluster allocating unit 1122 also determines the membership probability in consideration of a degree of an error between a predicted value and a results value due to a prediction model. Accordingly, the cluster allocating unit 1122 can perform co-clustering more accurately. As a result, according to the present exemplary embodiment, a prediction model having a higher accuracy of prediction can be generated.

The description above has been provided by using, as an example, a case where a value of the objective variable is a continuous value, but the value of the objective variable may be a category value. In a case where the value of the objective variable is the category value, the prediction model learning unit 1121 can generate the prediction model by employing a multi class support vector machine (SVM) as a prediction model learning algorithm. In a case where the value of the objective variable is the category value and linear regression is employed as the learning algorithm, it is sufficient if a results value in teaching data is expressed in the 1-of-k form and the prediction model learning unit 1121 learns the prediction model.

In addition, in a case where the value of the objective variable is the category value, an error between a results value and a predicted value of a relationship between the first ID and the second ID is "0" if the results value matches the predicted value, and the error is "1" if the results value does not match the predicted value.

Exemplary Embodiment 2

A prediction model generation system according to a second exemplary embodiment of the present invention performs co-clustering, and then generates a prediction model for each combination of a first ID cluster and a second ID cluster. In the present exemplary embodiment, a description is provided by using, as an example, a case where the prediction model generation system generates the prediction model and then predicts a relationship between IDs by using the prediction model.

Figure 9:
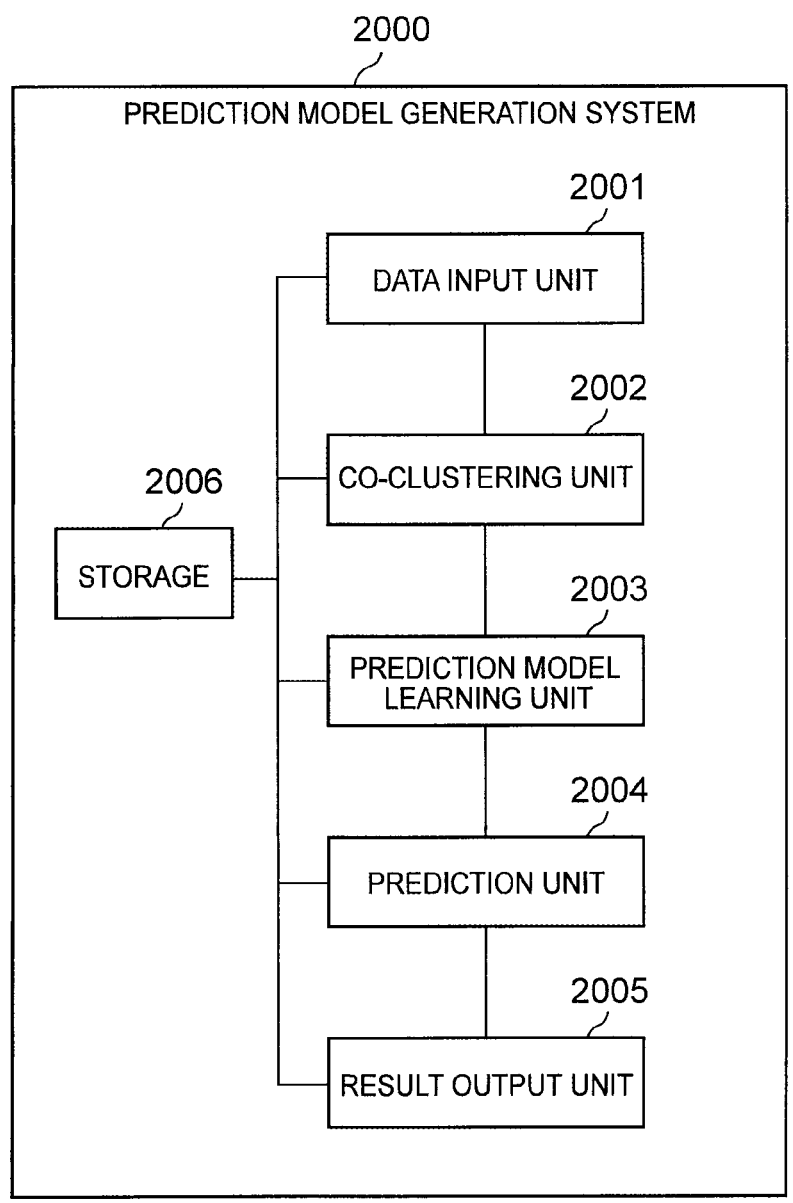
FIG. 9 It depicts a functional block diagram illustrating an example of a prediction model generation system according to a second exemplary embodiment of the present invention.

FIG. 9 depicts a functional block diagram illustrating an example of the prediction model generation system according to the second exemplary embodiment of the present invention. A prediction model generation system 2000 according to the second exemplary embodiment includes a data input unit 2001, a co-clustering unit 2002, a prediction model learning unit 2003, a prediction unit 2004, a result output unit 2005, and a storage 2006.

The storage 2006 is a storage device that stores various types of data.

The data input unit 2001 obtains first master data, second master data, and fact data, and various setting values, and stores, in the storage 2006, the respective pieces of data and the setting values that have been obtained. For example, the data input unit 2001 may access an external device so as to obtain the respective pieces of data and the various setting values. Alternatively, the data input unit 2001 may be an input interface to which the respective pieces of data and the setting values are input.

The first master data, the second master data, and the fact data are respectively similar to the first master data, the second master data, and the fact data according to the first exemplary embodiment. A form of the fact data may be the form illustrated in FIG. 18 or the form illustrated in FIG. 1. Hereinafter, assume that the first master data is master data relating to customers and a first ID is a customer ID. Also assume that the second master data is master data relating to merchandise and a second ID is a merchandise ID. Further assume that the fact data is purchase results data.

The various setting values are similar to the setting values of clustering described in the first exemplary embodiment. Stated another way, these setting values are, for example, a maximum value of the number of first ID clusters, a maximum value of the number of second ID clusters, attribute names of attributes that correspond to explanatory variables in the prediction model, an attribute that corresponds to an objective variable, the type of the prediction model, and the like. The second exemplary embodiment is also described by using, as an example, a case where a value of the objective variable is a continuous value for simplification of description. The description below is provided by using, as an example, a case where the attribute that corresponds to the objective variable is, for example, a probability of a customer specified by the first ID purchasing merchandise specified by the second ID. The attribute that corresponds to the objective variable is not limited to the probability described above.

The co-clustering unit 2002 performs co-clustering on the first IDs and the second IDs on the basis of the first master data, the second master data, and the fact data. A mode of clustering is soft clustering. Accordingly, the co-clustering unit 2002 determines a membership probability of a certain first ID belonging to each of the first ID clusters. The similar is applied to another first ID. The co-clustering unit 2002 also determines a membership probability of a certain second ID belonging to each of the second ID clusters. The similar is applied to another second ID. The co-clustering unit 2002 stores a result of co-clustering in the storage 2006.

A method used for the co-clustering unit 2002 to perform co-clustering on the first IDs and the second IDs on the basis of the first master data, the second master data, and the fact data may be a publicly known co-clustering method.

The prediction model learning unit 2003 performs learning so as to generate a prediction model for each of the combinations of the first ID cluster and the second ID cluster. In the first exemplary embodiment, a case has been described where the processes of steps S3 to S6 depicted in FIG. 8 are repeated until it is determined that the terminal conditions are satisfied. In the second exemplary embodiment, a description is provided by using, as an example, a case where the repetition described above is not performed. Accordingly, in the second exemplary embodiment, the prediction model learning unit 2003 generates the prediction model after the co-clustering unit 2002 has completed co-clustering on the first IDs and the second IDs.

In the present exemplary embodiment, similarly to the first exemplary embodiment, a description is provided by using, as an example, a case where the prediction model is the formula $y=w^t x$.

Processing in which the prediction model learning unit 2003 generates the prediction model is similar to processing in which the prediction model learning unit 1121 generates the prediction model according to the first exemplary embodiment. Stated another way, in the case of generating a prediction model that corresponds to a certain combination of the first ID cluster and the second ID cluster, the prediction model learning unit 2003 generates the prediction model as described below. Assume that, for each of the combinations of the first ID and the second ID, a predicted value is obtained by substituting attribute values for the explanatory variables, a value is obtained by multiplying the predicted value by a membership probability of the first ID belonging to a first ID cluster of interest and a membership probability of the second ID belonging to a second ID cluster of interest, and a difference is obtained between the value and a results value of the objective variable. In this case, the prediction model learning unit 2003 determines a column vector w in the prediction model in such a way that the sum of the differences becomes minimum. As a result, the prediction model $y=w^t x$ is determined.

Assume, for example, that a prediction model that corresponds to a combination of the first ID cluster "1" and the second ID cluster "2" is generated. In this case, the prediction model learning unit 2003 determines column vector $w_{12}$ by which Formula (1) described in the first exemplary embodiment has a minimum value so as to generate the prediction model that corresponds to the combination. The prediction model learning unit 2003 similarly generates a prediction model that corresponds to a combination of another first ID cluster and another second ID cluster.

The prediction model learning unit 2003 stores the respective generated prediction models in the storage 2006.

The prediction unit 2004 receives the specification of a first ID and a second ID serving as targets for prediction of a relationship between two matters from the outside. For example, the prediction unit 2004 receives an input of the first ID and the second ID from a user. Then, the prediction unit 2004 predicts a relationship between the first ID and the second ID by using each of the learning models generated by the prediction model learning unit 2003. It is sufficient if the user specifies, for example, a first ID and a second ID that have been determined in the fact data to have no relationship between the two (for example, a combination of a customer ID and merchandise ID for which purchase results do not exist). However, the user may specify a first ID and a second ID that have been determined to have a relationship between the two.

The prediction unit 2004 calculates, for each of the prediction models, a value of the objective variable by using an attribute value of the specified first ID and an attribute value of the specified second ID. At this time, in a case where an attribute (such as purchase date and time) that is indicated by the fact data has been set as one of the attributes that correspond to the explanatory variables, the prediction unit 2004 calculates the value of the objective variable by also using a value of the attribute. In a case where it has been determined in the fact data that the first ID and the second ID do not have relationship and purchase date and time, or the like that corresponds to a combination of the first ID and the second ID does not exist in the fact data, a prescribed value such as "0" may be used, for example, as the value of the attribute.

In addition, the prediction unit 2004 calculates, for each of the prediction models, the product of a membership probability of the specified first ID belonging to a first ID cluster that corresponds to a prediction model of interest and a membership probability of the specified second ID belonging to a second ID cluster that corresponds to the prediction model of interest.

Then, the prediction unit 2004 derives a result of performing weighted addition on the value of the objective variable that has been calculated for each of the prediction models by using the product above that has been calculated for each of the prediction models, as a prediction result of a relationship between the first ID and the second ID that have been specified. Details of an operation of the prediction unit 2004 are described later with reference to FIG. 11.

The result output unit 2005 outputs the prediction result derived by the prediction unit 2004. A mode of the result output unit 2005 outputting the prediction result is not particularly limited. For example, the result output unit 2005 may output the prediction result to another device. Alternatively, for example, the result output unit 2005 may display the prediction result on a display device.

In addition, the result output unit 2005 may output a result of co-clustering (a membership probability of each individual first ID belonging to each individual first ID cluster and a membership probability of each individual second ID belonging to each individual second ID cluster) or the respective prediction models generated by the prediction model learning unit 2003, in addition to the prediction result.

The data input unit 2001, the co-clustering unit 2002, the prediction model learning unit 2003, the prediction unit 2004, and the result output unit 2005 are implemented, for example, by a CPU of a computer that operates according to a program (a prediction model generation program). In this case, it is sufficient if the CPU reads the program, for example, from a program recording medium such as a program storage device (not depicted in FIG. 9) of the computer and operates as the data input unit 2001, the co-clustering unit 2002, the prediction model learning unit 2003, the prediction unit 2004, and the result output unit 2005 in accordance with the program. In addition, each of the data input unit 2001, the co-clustering unit 2002, the prediction model learning unit 2003, the prediction unit 2004, and the result output unit 2005 may be implemented by dedicated hardware.

Figure 10:
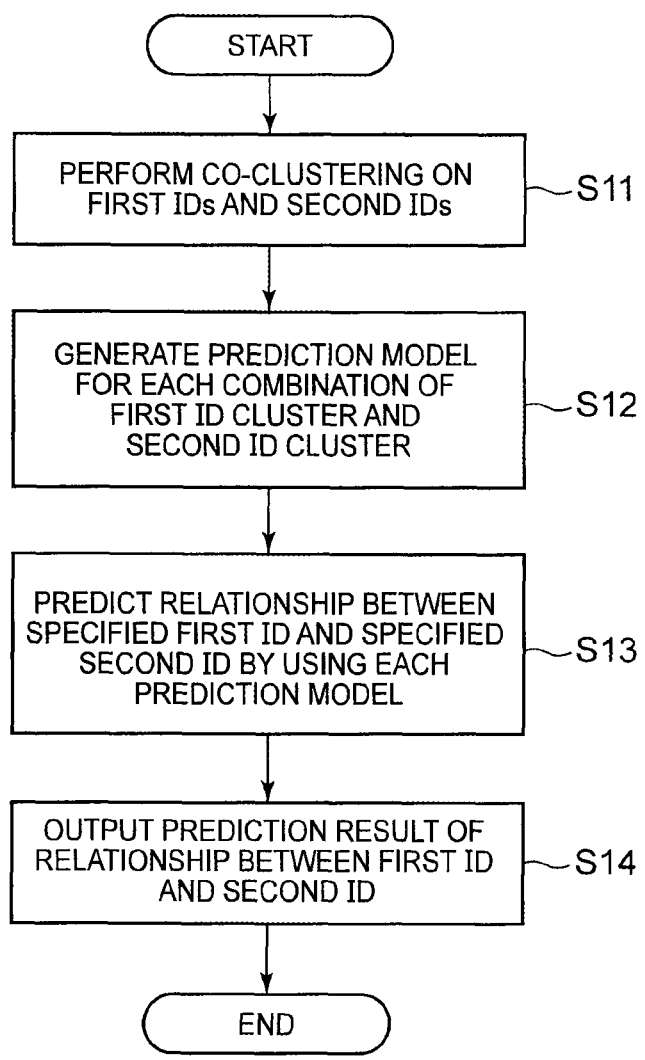
FIG. 10 It depicts a flowchart illustrating an example of a processing progress according to the second exemplary embodiment.

Next, a processing progress according to the second exemplary embodiment is described. FIG. 10 depicts a flowchart illustrating an example of the processing progress according to the second exemplary embodiment.

The data input unit 2001 obtains the first master data, the second master data, and the fact data, and the various setting values, and stores them in the storage 2006. In response to this, the co-clustering unit 2002 performs co-clustering on the first IDs and the second IDs on the basis of the first master data, the second master data, and the fact data (step S11). The co-clustering unit 2002 stores, in the storage 2006, a membership probability of each individual first ID belonging to each individual first ID cluster and a membership probability of each individual second ID belonging to each individual second ID cluster, as a result of co-clustering.

After step S11, the prediction model learning unit 2003 generates a prediction model for each combination of the first ID cluster and the second ID cluster (step S12). The prediction model learning unit 2003 stores the respective generated prediction models in the storage 2006.

Processing in which the prediction model learning unit 2003 generates each of the prediction models is similar to processing in which the prediction model learning unit 1121 generates each of the prediction models according to the first exemplary embodiment, and a description is omitted.

After step S12, when a first ID and a second ID serving as targets for prediction of a relationship between two matters are specified from the outside, the prediction unit 2004 predicts a relationship between the specified first ID and the specified second ID by using each of the prediction models generated in step S12 (step S13).

After step S13, the result output unit 2005 outputs a prediction result of the relationship between the specified first ID and the specified second ID (step S14).

Figure 11:
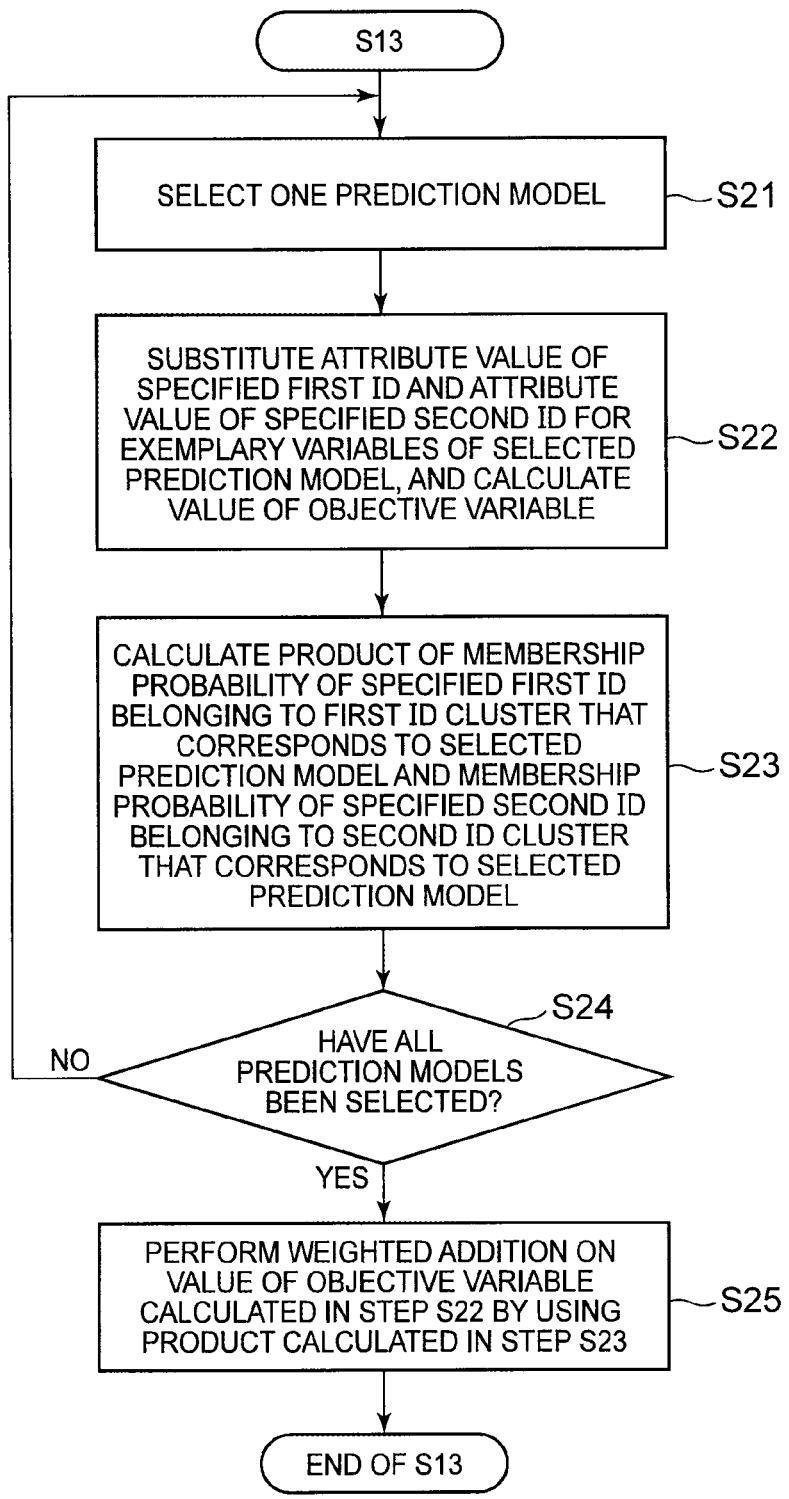
FIG. 11 It depicts a flowchart illustrating an example of the processing progress of step S13.

FIG. 11 depicts a flowchart illustrating an example of the processing progress of step S13.

In step S13, the prediction unit 2004 selects one prediction model from the respective prediction models generated in step S12 (step S21). This prediction model corresponds to one of the combinations of the first ID cluster and the second ID cluster.

The prediction unit 2004 substitutes an attribute value of the specified first ID and an attribute value of the specified second ID for exemplary variables of the selected prediction model so as to calculate a value of the objective variable (step S22). In a case where an attribute (such as purchase date and time) that is indicated by the fact data has been set as one of the attributes that correspond to the explanatory variables, it is sufficient if the prediction unit 2004 also substitutes a value of the attribute for a corresponding exemplary variable. It is sufficient if the prediction unit 2004 reads the attribute value of the first ID from the first master data and reads the attribute value of the second ID from the second master data. It is also sufficient if the prediction unit 2004 reads a value of the attribute indicated by the fact data from the fact data.

After step S22, the prediction unit 2004 specifies a first ID cluster that corresponds to the selected prediction model and a second ID cluster that corresponds to the prediction model. For example, in a case where the selected prediction model corresponds to a combination of the first ID cluster "2" and the second ID cluster "3", it is sufficient if the prediction unit 2004 specifies the first ID cluster "2" and the second ID cluster "3". Then, the prediction unit 2004 calculates the product of a membership probability of the specified first ID belonging to the first ID cluster and a membership probability of the specified second ID belonging to the second ID cluster (step S23).

Next, the prediction unit 2004 determines whether all of the prediction models have been selected (step S24). When not all of the prediction models have been selected (No in step S24), the prediction unit 2004 repeats the processes of step S21 and steps that follow.

When all of the prediction models have been selected (Yes in step S24), the prediction unit 2004 performs weighted addition on the value of the objective variable that has been calculated for each of the prediction models by using the product above that has been calculated for each of the prediction models (step S25). In other words, the prediction unit 2004 performs weighted addition on the value of the objective variable that has been calculated in step S22 by using the product calculated in step S23. More specifically, the prediction unit 2004 multiplies a value of the objective variable that has been calculated at each time of step S22 by a product calculated at a corresponding time of step S23, and calculates the sum of multiplication results. This sum (a result of weighted addition) is the prediction result of the relationship between the specified first ID and the specified second ID.

In step S25, the prediction result of the relationship between the first ID and the second ID (in this example, a prediction result of a probability of a customer specified by the first ID purchasing merchandise specified by the second ID) is obtained. In step S25, step S13 is finished, and as described above, the result output unit 2005 outputs the prediction result of the relationship between the specified first ID and the specified second ID (step S14).

According to the second exemplary embodiment, the co-clustering unit 2002 performs co-clustering on the first IDs (the customer IDs) and the second IDs (the merchandise IDs) on the basis of the first master data, the second master data, and the fact data. Accordingly, a tendency indicated by the fact data (in this example, a purchase tendency at a time when a customer purchases merchandise) is reflected in a clustering result. Thus, even when a potential characteristic of the customer or a potential characteristic of the merchandise is not clarified in the master data, membership probabilities of respective IDs having a common potential characteristic increase in a specified cluster. Then, the prediction model learning unit 2003 generates a prediction model for each of the combinations of the first ID cluster and the second ID cluster. Accordingly, a prediction model that enables the accurate prediction of a relationship between the first ID and the second ID can be generated.

Further, in the second exemplary embodiment, the prediction unit 2004 predicts a relationship between a first ID and a second ID that have been specified, by using each of the prediction models. Accordingly, according to the present exemplary embodiment, the prediction model can be generated, and a prediction result having a high accuracy can also be derived. Assume, for example, that a first ID and a second ID that have been determined in the fact data to have no relationship between the two (for example, a combination of a customer ID and merchandise ID for which purchase results do not exist) are specified. In this case, the prediction unit 2004 predicts a relationship between the first ID and the second ID (in this example, a probability of a customer specified by the first ID purchasing merchandise specified by the second ID). Accordingly, a user of the prediction model generation system can grasp whether the customer specified by the first ID originally has little relationship with the merchandise specified by the second ID, whether there is a high probability of the future occurrence of a relationship between the two although there is no relationship between the two at a present point in time, or the like. More specifically, the user can grasp, for example, whether there is originally a low probability of the customer specified by the first ID purchasing the merchandise specified by the second ID, whether there is a high probability of the customer purchasing the merchandise in the future although the customer has not purchased the merchandise at a present point in time, or the like. As a result, the user can consider the sending of a direct mail to customers having a high probability of purchasing merchandise, or the like in order to increase the sales of the merchandise.

The description above has been provided by using, as an example, a case where a value of the objective variable is a continuous value, but the value of the objective variable may be a category value.

In a case where the value of the objective variable is a category value, it is sufficient if the prediction unit 2004 performs the processing described below in step S25 rather than the process described above of step S25. In a case where the value of the objective variable is a category value, a value that corresponds to one class of a plurality of classes is calculated in step S22. Stated another way, the prediction unit 2004 specifies a single class at each time of step S22. In step S25, the prediction unit 2004 calculates the sum of the products that have been calculated in step S23, for each of the classes specified at the respective times of step S22. Then, the prediction unit 2004 determines a class for which the sum becomes maximum as a prediction result. Assume, for example, that the class "1", "2", "3", or the like is specified at each time of step S22. The prediction unit 2004 calculates the sum of products that have been calculated at times of step S23 that follow respective times of step S22 at which the class "1" has been specified. The prediction unit 2004 performs similar calculation with respect to the classes "2", "3", and the like. For example, in a case where a class for which the calculated sum becomes maximum is the class "2", it is sufficient if the prediction unit 2004 determines the class "2" as a prediction result.

In other points of the case where the value of the objective variable is a category value, the processing is similar to processing in a case where the value of the objective variable is a category value according to the first exemplary embodiment.

Exemplary Embodiment 3

In contrast to the prediction model generation system 1000 described in the first exemplary embodiment, the prediction model generation system 2000 described in the second exemplary embodiment does not repeat prediction model generation processing and co-clustering processing, but generates a prediction model after co-clustering is completed (see FIG. 10).

Similarly to the first exemplary embodiment, a prediction model generation system according to a third exemplary embodiment of the present invention repeats the processes of steps S3 to S6 so as to perform co-clustering on first IDs and second IDs and generate a prediction model for each combination of a first ID cluster and a second ID cluster. Further, when a first ID and a second ID serving as targets for prediction of a relationship between two matters are specified, the prediction model generation system according to the third exemplary embodiment of the present invention predicts a relationship between the first ID and the second ID by using each learning model.

Figure 12:
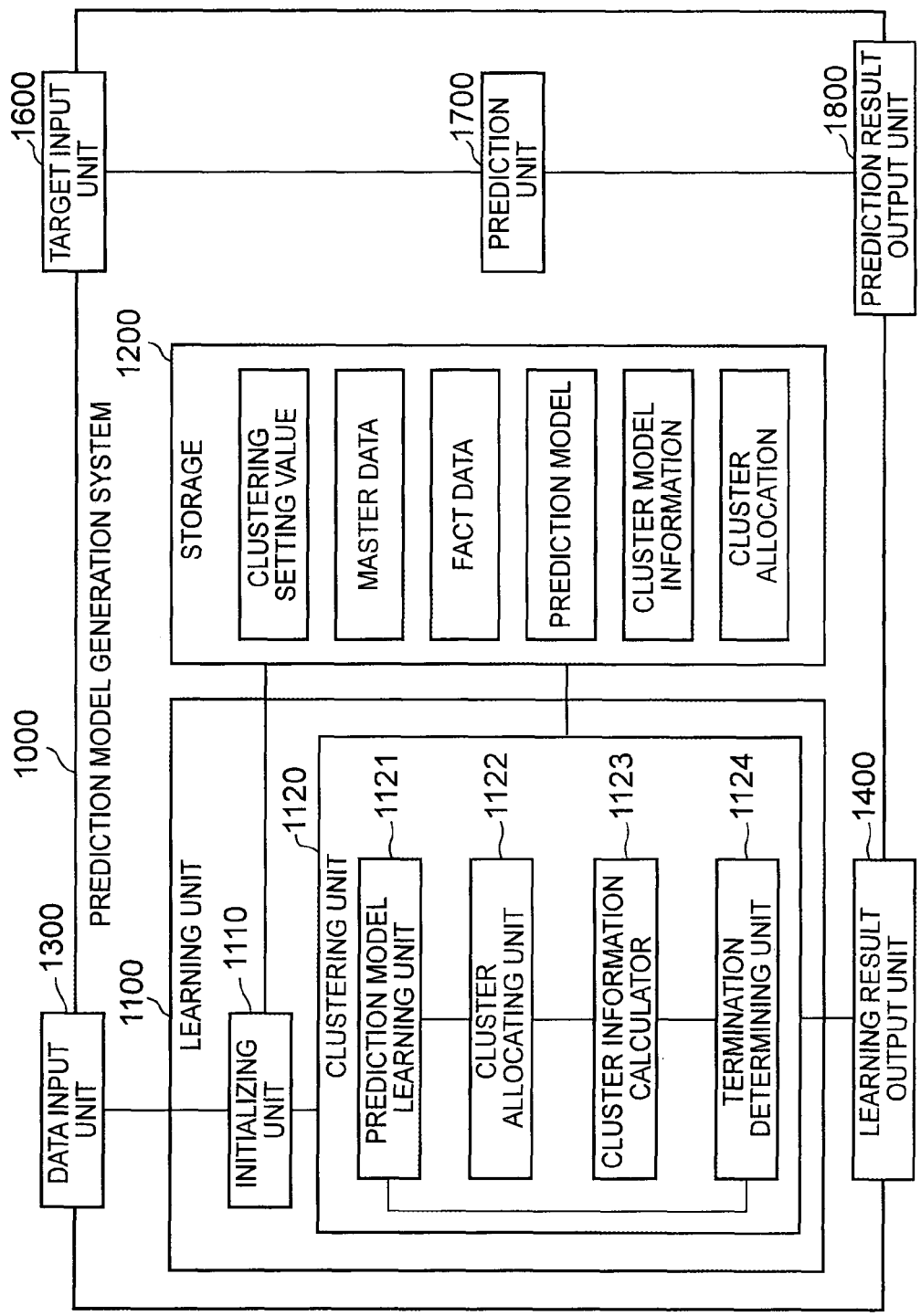
FIG. 12 It depicts a functional block diagram illustrating an example of a prediction model generation system according to a third exemplary embodiment of the present invention.

FIG. 12 depicts a functional block diagram illustrating an example of the prediction model generation system according to the third exemplary embodiment of the present invention. Elements similar to elements in the first exemplary embodiment are denoted by reference signs identical to reference signs in FIG. 2, and a description is omitted. A prediction model generation system 1000 according to the third exemplary embodiment includes a data input unit 1300, a learning unit 1100, a storage 1200, and a learning result output unit 1400, and further includes a target input unit 1600, a prediction unit 1700, and a prediction result output unit 1800.

Note that first master data, second master data, and fact data that are obtained by the data input unit 1300 are respectively similar to the first master data, the second master data, and the fact data according to the first exemplary embodiment. A form of the fact data may be the form illustrated in FIG. 18 or the form illustrated in FIG. 1. Hereinafter, assume that the first master data is master data relating to customers and a first ID is a customer ID. Also assume that the second master data is master data relating to merchandise and a second ID is a merchandise ID. Further assume that the fact data is purchase results data.

The third exemplary embodiment is also described by using, as an example, a case where a value of an objective variable is a continuous value for simplification of description. The description below is provided by using, as an example, a case where an attribute that corresponds to the objective variable is a probability of a customer specified by the first ID purchasing merchandise specified by the second ID.

In the description below, assume that the prediction model generation system 1000 has already completed the operations of steps S1 to S7 described in the first exemplary embodiment. Stated another way, assume that a result of co-clustering and a prediction model for each combination of a first ID cluster and a second ID cluster that have been most recently obtained at a point in time at which termination conditions are satisfied have been stored in the storage 1200.

The target input unit 1600 obtains a first ID and a second ID serving as targets for prediction of a relationship between two matters. For example, the target input unit 1600 may access an external device so as to obtain the first ID and the second ID. It is sufficient if, for example, a first ID and a second ID that have been determined in the fact data to have no relationship between the two (such as a combination of a customer ID and a merchandise ID for which purchase results do not exist) are specified in advance as the first ID and the second ID that will be obtained by the target input unit 1600. However, a first ID and a second ID that have been determined in the fact data to have a relationship between the two may be specified. In addition, the target input unit 1600 may be an input interface to which the first ID and the second ID described above are input.

It can be said that the first ID and the second ID that have been obtained by the target input unit 1600 are the first ID and the second ID that have been specified. Similarly, it can be said that the first ID and the second ID that have input to the target input unit 1600 are the first ID and the second ID that have been specified.

An operation of the prediction unit 1700 is similar to an operation of the prediction unit 2004 in the second exemplary embodiment. The prediction unit 1700 calculates, for each of the prediction models, a value of the objective variable by using an attribute value of the specified first ID and an attribute value of the specified second ID. At this time, in a case where an attribute (such as purchase date and time) that is indicated by the fact data has been set as an attribute that corresponds to an explanatory variable, the prediction unit 1700 calculates the value of the objective variable by also using a value of the attribute. In a case where it has been determined in the fact data that the first ID and the second ID do not have relationship and purchase date and time, or the like that corresponds to a combination of the first ID and the second ID does not exist in the fact data, a prescribed value such as "0" may be used, for example, as the value of the attribute.

In addition, the prediction unit 1700 calculates, for each of the prediction models, the product of a membership probability of the specified first ID belonging to a first ID cluster that corresponds to a prediction model of interest and a membership probability of the specified second ID belonging to a second ID cluster that corresponds to the prediction model of interest.

Then, the prediction unit 1700 derives a result of performing weighting on the value of the objective variable that has been calculated for each of the prediction models by using the product above that has been calculated for each of the prediction models, as a prediction result of a relationship between the first ID and the second ID that have been specified.

The prediction result output unit 1800 outputs the prediction result derived by the prediction unit 1700. A mode of the prediction result output unit 1800 outputting the prediction result is not particularly limited. For example, the prediction result output unit 1800 may output the prediction result to another device. Alternatively, for example, the prediction result output unit 1800 may display the prediction result on a display device.

The target input unit 1600, the prediction unit 1700, and the prediction result output unit 1800 are implemented, for example, by a CPU of a computer that operates according to a program (a prediction model generation program), similarly to the clustering unit 1120 and the like.

Figure 13:
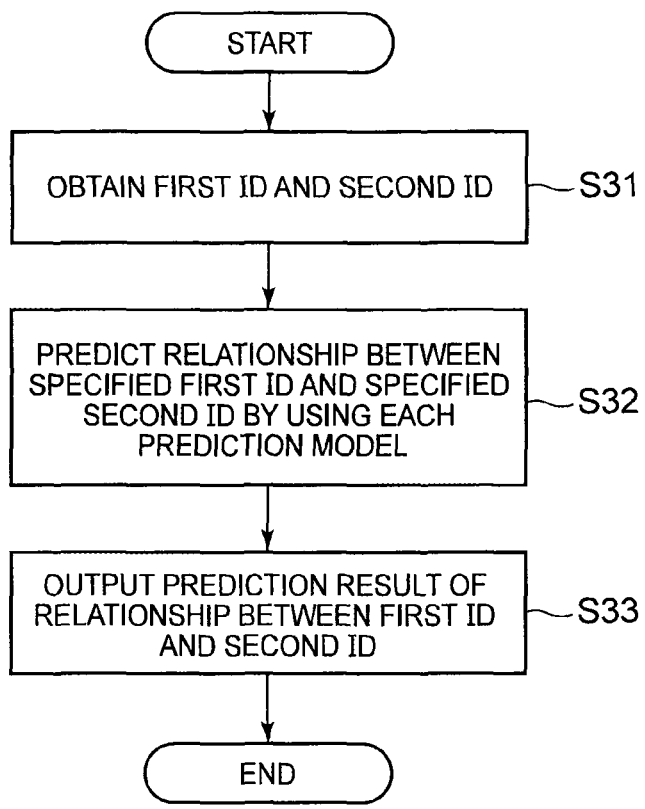
FIG. 13 It depicts a flowchart illustrating an example of a progress of prediction processing according to the third exemplary embodiment of the present invention.

FIG. 13 depicts a flowchart illustrating an example of a progress of prediction processing according to the third exemplary embodiment of the present invention. As described above, assume that the prediction model generation system 1000 has already completed the operation described in the first exemplary embodiment.

Assume, for example, that a first ID and a second ID that have been specified by a user and that serve as targets for prediction of a relationship between two matters have been stored in an external device. The target input unit 1600 accesses the external device, and obtains the first ID and the second ID that have been specified (step S31). The target input unit 1600 may be an input interface, and the first ID and the second ID that have been specified by the user may be input by the user.

Next, the prediction unit 1700 predicts a relationship between the specified first ID and the specified second ID by using a prediction model for each combination of a first ID cluster and a second ID cluster (step S32). The operation of step S32 is similar to the operation of step S13 in the second exemplary embodiment, and the processing progress of step S32 can be illustrated similarly to the processing progress of the flowchart depicted in FIG. 11. An operation performed by the prediction unit 1700 in step S32 is described below with reference to FIG. 11. With regard to steps S21 to S25 depicted in FIG. 11, the description of matters similar to the already described matters is appropriately omitted.

In step S32, the prediction unit 1700 selects one prediction model from respective prediction models generated for the respective combinations of the first ID cluster and the second ID cluster (step S21).

The prediction unit 1700 substitutes an attribute value of the specified first ID and an attribute value of the specified second ID for exemplary variables of the selected prediction model so as to calculate a value of an objective variable (step S22).

Next, the prediction unit 1700 specifies a first ID cluster that corresponds to the selected prediction model and a second ID cluster that corresponds to the prediction model. Then, the prediction unit 1700 calculates the product of a membership probability of the specified first ID belonging to the first ID cluster and a membership probability of the specified second ID belonging to the second ID cluster (step S23).

Next, the prediction unit 1700 determines whether all of the prediction models have been selected (step S24). When not all of the prediction models have been selected (No in step S24), the prediction unit 1700 repeats the processes of step S21 and steps that follow.

When all of the prediction models have been selected (Yes in step S24), the prediction unit 1700 performs weighted addition on the value of the objective variable that has been calculated for each of the prediction models by using the product above that has been calculated for each of the prediction models (step S25). Stated another way, the prediction unit 1700 performs weighted addition on the value of the objective variable that has been calculated in step S22 by using the product calculated in step S23. More specifically, the prediction unit 1700 multiplies a value of the objective variable that has been calculated at each time of step S22 by a product calculated at a corresponding time of step S23, and calculates the sum of multiplication results. This sum (a result of weighted addition) is the prediction result of the relationship between the specified first ID and the specified second ID.

In step S25, the prediction result of the relationship between the first ID and the second ID (in this example, a prediction result of a probability of a customer specified by the first ID purchasing merchandise specified by the second ID) is obtained. In step S25, step S32 (see FIG. 13) is finished.

After step S32, the prediction result output unit 1800 outputs the prediction result of the relationship between the specified first ID and the specified second ID (step S33).

According to the third exemplary embodiment, effects similar to effects in the first exemplary embodiment are obtained.

Further, in the third exemplary embodiment, the prediction unit 1700 predicts a relationship between a specified first ID and a specified second ID by using each of the prediction models. Accordingly, according to the present exemplary embodiment, a prediction result having a high accuracy can be derived similarly to the second exemplary embodiment. Assume, for example, that a first ID and a second ID that have been determined in the fact data to have no relationship between the two (for example, a combination of a customer ID and merchandise ID for which purchase results do not exist) are specified. In this case, the prediction unit 1700 predicts a relationship between the first ID and the second ID (in this example, a probability of a customer specified by the first ID purchasing merchandise specified by the second ID). Accordingly, a user of the prediction model generation system can grasp whether the customer specified by the first ID originally has little relationship with the merchandise specified by the second ID, whether there is a high probability of the future occurrence of a relationship between the two although there is no relationship between the two at a present point in time, or the like. More specifically, the user can grasp, for example, whether there is originally a low probability of the customer specified by the first ID purchasing the merchandise specified by the second ID, whether there is a high probability of the customer purchasing the merchandise in the future although the customer has not purchased the merchandise at a present point in time, or the like. As a result, the user can consider the sending of a direct mail to customers having a high probability of purchasing merchandise, or the like in order to increase the sales of the merchandise.

In addition, in the second exemplary embodiment and the third exemplary embodiment, a description has been provided by using, as an example, a case where a first ID and a second ID that have been determined in the fact data to have no relationship between the two are specified as a first ID and a second ID serving as targets for prediction of a relationship between two matters. In the second exemplary embodiment and the third exemplary embodiment, a first ID and a second ID that have been determined in the fact data to have a relationship between the two may be specified as the first ID and the second ID serving as targets for prediction of a relationship between two matters. For example, the fact data illustrated in FIG. 1 indicates a relationship indicating that a customer specified by the customer ID "1" (hereinafter referred to as the customer "1") has purchased a customer specified by the merchandise ID "2" (hereinafter referred to as the merchandise "2"). In this case, the customer ID "1" and the merchandise ID "2" may be specified. In the second exemplary embodiment and the third exemplary embodiment, the prediction units 2004 and 1700 derive, for example, a probability of the customer "1" purchasing the merchandise "2" as a prediction result. In a case where this probability has a small value, a user of the prediction model generation system can presume that the customer "1" and the merchandise "2" originally have little relationship but the customer "1" has happened to purchase the merchandise "2". In a case where this probability has a large value, the user of the prediction model generation system can presume that the customer "1" and the merchandise "2" originally have close relationship and the customer "1" has actually purchased the merchandise "2".

Similarly in the third exemplary embodiment, a description has been provided by using, as an example, a case where the value of the objective variable is a continuous value, but the value of the objective variable may be a category value. An operation that is performed by the prediction unit 1700 in step S25 in a case where the value of the objective variable is a category value is similar to the operation of the prediction unit 2004 described in the second exemplary embodiment, and a description is omitted here. In other points of the case where the value of the objective variable is a category value, the processing is similar to processing in a case where the value of the objective variable is a category value according to the first exemplary embodiment.

In the respective exemplary embodiments described above, a description has been provided by using, as an example, a case where the first master data is master data relating to customers, the second master data is master data relating to merchandise, and the fact data is purchase results data. Further, in the respective exemplary embodiments described above, a description has been provided by using, as an example, a case where the first ID is a customer ID and the second ID is a merchandise ID. The first master data, the second master data, the fact data, and the first and second IDs are not limited to the examples above.

For example, the first master data may be master data relating to employees that belong to a company, and the second master data may be master data relating to a project in the company. The first ID may be an employee ID for identifying an employee that belongs to the company, and the second ID may be a project ID for identifying a project in the company. The fact data may be results data indicating whether each individual employee has taken charge of each individual project.

In this case, a prediction model for accurately predicting a relationship between the employee ID and the project ID can be generated. In addition, in the second exemplary embodiment and the third exemplary embodiment, a relationship between the employee ID and the project ID (a relationship between an employee and a project) can be accurately predicted. For example, in a case where a certain employee (referred to as "P") has not taken charge of a certain project (referred to as "Q"), assume that a prediction result has been obtained that indicates that the employee "P" has a close relationship with the project "Q". In this case, a user of the prediction model generation system can presume, for example, that the employee "P" can play an active part in the project "Q".

SPECIFIC EXAMPLES

Specific examples of calculation formulae are described below in a case where the cluster allocating unit 1122 calculates a membership probability of an ID belonging to a cluster in the first exemplary embodiment and the third exemplary embodiment. In addition, specific examples of calculation formulae are described in a case where the cluster information calculator 1123 calculates a mean value as model information. In the description below, a case where variation inference is used as an algorithm for learning a prediction model is used as an example. In addition, a description is provided by using, as an example, a case where the first master data is master data relating to customers, the second master data is master data relating to merchandise, and the fact data is purchase results data. Further, a description is provided by using, as an example, a case where the value of the objective variable is a category value, and a prediction model for predicting one class from a plurality of classes is generated. Stated another way, a description is provided by using, as an example, a case where a prediction model for performing multi-class classification is generated.

Note that hat marks in formulae are omitted in the description below. The meanings of marks to be used in the respective formulae below are described later. However, the description of the already described marks is omitted.

A membership probability of a $d_1$-th customer ID belonging to the customer ID cluster "$k_1$" is assumed to be log $q(z_{d_1}=k_1)$. The cluster allocating unit 1122 can calculate this membership probability according to Formula (4) described below.

[Formula 4]

$$\log q(z_{d_1} = k_1) \propto -\rho \|x_{d_1} - \hat{m}_{k_1}\|^2 + (1-\rho) \sum_{y_1}^{Y_1} \sum_{d_2}^{D_2} \sum_{k_2}^{K_2} \omega_{y_1 d_1 d_2} q(z_{d_2} = k_2) w_{k_1 k_2}^\top f_{d_1 d_2}^\Delta (y_1) \quad (4)$$

A first term in Formula (4) indicates how close to a mean value $m_{k_1}$ of attribute values in the customer ID cluster "$k_1$" an attribute value (such as age or height) of the $d_1$-th customer ID is. As both become closer to each other, a value of the first term becomes larger. Note that the mean value $m_{k_1}$ of the attribute values is cluster model information in this example.

A second term in Formula (4) indicates a degree of an error between an actual measurement value and a predicted value of a relationship between a customer ID and each merchandise ID in a case where the $d_1$-th customer ID is allocated to the customer ID cluster "$k_1$". As the degree of the error decreases, a value of the second term increases.

ρ is a hyper parameter that has a value within a range of [0, 1]. As a value of ρ becomes closer to 1, proximity of an attribute value and cluster model information is regarded as more important. In addition, as the value of ρ becomes closer to 0, the accuracy of prediction of a relationship is regarded as more important.

Similarly, a membership probability of a $d_2$-th merchandise ID belonging to the merchandise ID cluster "$k_2$" is assumed to be $\log q(z_{d_2}=k_2)$. The cluster allocating unit 1122 can calculate this membership probability according to Formula (5) described below.

[Formula 5]

$$\log q(z_{d_2} = k_2) \propto -\rho\|x_{d_2} - \hat{m}_{k_2}\|^2 + (1-\rho)\sum_{y_1}^{Y_1}\sum_{d_1}^{D_1}\sum_{k_1}^{K_1} \omega_{y_1 d_1 d_2} q(z_{d_1} = k_1) w^T_{k_1 k_2} f^\Delta_{d_1 d_2}(y_1) \quad (5)$$

In addition, the cluster information calculator 1123 can calculate the mean value $m_{k_1}$ of the attribute values in the customer ID cluster "$k_1$" according to Formula (6) described below.

[Formula 6]

$$\hat{m}_{k_1} = \frac{\sum_{d_1} q(z_{d_1} = k_1) x_{d_1}}{1 + \sum_{d_1} q(z_{d_1} = k_1)} \quad (6)$$

Similarly, the cluster information calculator 1123 can calculate a mean value m of attribute values in the merchandise ID cluster "$k_2$" according to Formula (7) described below.

[Formula 7]

$$\hat{m}_{k_2} = \frac{\sum_{d_2} q(z_{d_2} = k_2) x_{d_2}}{1 + \sum_{d_2} q(z_{d_2} = k_2)} \quad (7)$$

It can be said that Formula (6) is a formula similar to Formula (2) described above. It can also be said that Formula (7) is a formula similar to Formula (3) described above.

The meanings of marks used in Formula (4) and Formula (5) are described below.

$y_1$ is a class that corresponds to the objective variable indicated by the fact data.

$Y_1$ is the number of classes in multi-class classification. For example, in the case of two-class classification, "buy/not buy", $Y_1=2$ is established. For example, in a case where 24 hours are divided at each one hour and the objective variable indicates which time zone purchase is performed in, $Y_1=24$ is established.

$\omega_{y_1 d_1 d_2}$ is the magnitude of an influence of "purchase information relating to the $d_1$-th customer ID and the $d_2$-th merchandise ID" in the fact data on "criteria for determination of class y1" in a prediction model. As a value of $\omega_{y_1 d_1 d_2}$ increases, the magnitude of this influence increases.

$w^T_{k_1 k_2}$ is $w^T$ in a prediction model that corresponds to a combination of the customer ID cluster "$k_1$" and the merchandise ID cluster "$k_2$".

$f^\Delta_{d_1 d_2}(y_1)$ is an error between a prediction result and an actual measurement value in a case where the class "$y_1$" is a prediction result for "purchase information relating to the $d_1$-th customer ID and the $d_2$-th merchandise ID". In this example, if an actual measurement value relating to "purchase information relating to the $d_1$-th customer ID and the $d_2$-th merchandise ID" in the fact data is the class "$y_1$" and the actual measurement value matches the prediction result, $f^\Delta_{d_1 d_2}(y_1)=0$ is assumed to be established. If an actual measurement value indicated by the fact data does not match the prediction result "$y_1$", it is sufficient if $f^\Delta_{d_1 d_2}(y_1)$ is set to a prescribed value excluding 0.

Figure 14:
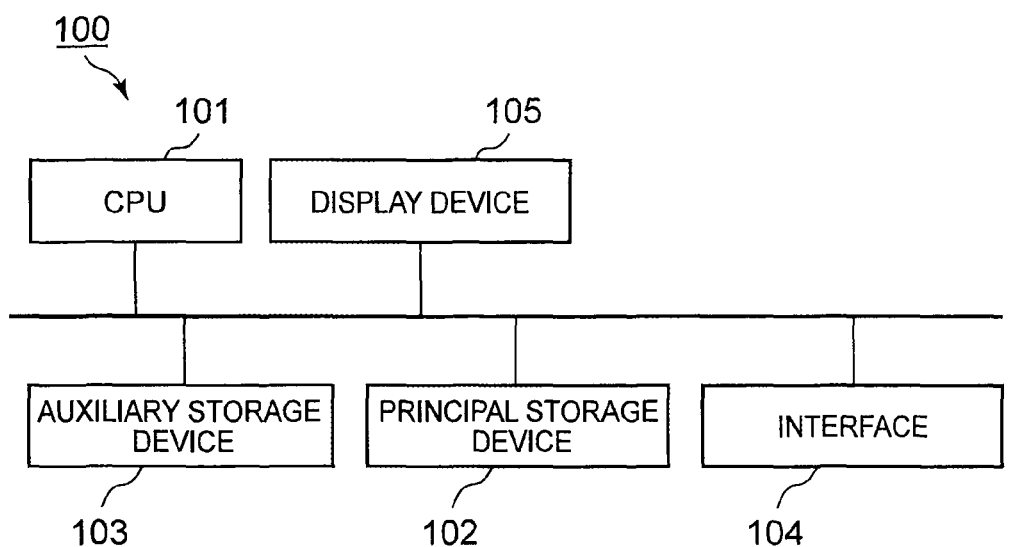
FIG. 14 It depicts a schematic block diagram illustrating a configuration example of a computer according to each of the exemplary embodiments of the present invention.

FIG. 14 depicts a schematic block diagram illustrating a configuration example of a computer according to each of the exemplary embodiments of the present invention. A computer 100 includes, for example, a CPU 101, a principal storage device 102, an auxiliary storage device 103, an interface 104, and a display device 105.

The prediction model generation system according to each of the exemplary embodiments of the present invention is mounted on the computer 100. An operation of the prediction model generation system according to each of the exemplary embodiments is stored in the auxiliary storage device 103 in the form of a program (a prediction model generation program). The CPU 101 reads the program from the auxiliary storage device 103, develops the program in the principal storage device 102, and performs the processing described above according to the program.

The auxiliary storage device 103 is an example of a non-transitory tangible medium. Other examples of the non-transitory tangible medium include a magnetic disk, a magneto-optical disk, a CD-ROM, a DVD-ROM, a semiconductor memory, and the like that are connected via the interface 104. In a case where this program is distributed to the computer 100 via a communication line, the computer 100 that has received distribution may develop the program in the principal storage device 102, and may perform the processing described above.

The program may be a program for implementing part of the processing described above. Further, the program may be a differential program for implementing the processing described above in combination with another program that has already been stored in the auxiliary storage device 103.

Some or all of respective components may be implemented by general-purpose or dedicated circuitry, a processor, or the like, or a combination thereof. They may be configured by a single chip, or may be configured by a plurality of chips connected via a bus. Some or all of the respective components may be implemented by a combination of the circuitry described above or the like and a program.

In a case where some or all of the respective components are implemented by a plurality of information processing devices, pieces of circuitry, or the like, the plurality of information processing devices, pieces of circuitry, or the like may be concentratedly disposed or distributed and disposed. For example, the information processing devices, the pieces of circuitry, or the like may be implemented in the form of connection to each other via a communication network, such as a client and server system or a cloud computing system.

Next, an outline of the present invention is described. FIG. 15 depicts a block diagram illustrating an outline of the prediction model generation system of the present invention. The prediction model generation system of the present invention includes co-clustering means 71, prediction model generation means 72, and determination means 73.

The co-clustering means 71 (for example, the cluster allocating unit 1122) performs co-clustering processing for performing co-clustering on first IDs and second IDs on the basis of first master data, second master data, fact data indicating a relationship between each of the first IDs and each of the second IDs. Each of the first IDs serves as an ID of a record in the first master data. Each of the second IDs serves as an ID of a record in the second master data.

The prediction model generation means 72 (for example, the prediction model learning unit 1121) performs prediction model generation processing for generating a prediction model for each combination of a first ID cluster and a second ID cluster. The prediction model uses the relationship between each of the first IDs and each of the second IDs as an objective variable. The first ID cluster serves as a cluster of the first IDs. The second ID cluster serves as a cluster of the second IDs.

The determination means 73 (for example, the termination determining unit 1124) determines whether a prescribed condition is satisfied.

Then, the prediction model generation system repeats the prediction model generation processing and the co-clustering processing until it is determined that the prescribed condition is satisfied.

In determining a probability of a single first ID belonging to a single first ID cluster, the co-clustering means 71 calculates a degree of an error between a results value and a predicted value of a relationship between the single first ID and each of the second IDs by using each of the prediction models that correspond to a combination of each of the second ID clusters and the single first ID cluster, and increases the probability as the degree of the error decreases. In determining a probability of a single second ID belonging to a single second ID cluster, the co-clustering means 71 calculates a degree of an error between a results value and a predicted value of a relationship between the single second ID and each of the first IDs by using each of the prediction models that correspond to a combination of each of the first ID clusters and the single second ID cluster, and increases the probability as the degree of the error decreases.

By employing the configuration above, a prediction model for accurately predicting a relationship between an ID of a record in the first master data and an ID of a record in the second master data can be generated.

In addition, it is desirable that a configuration be employed in which statistic calculation means is included for performing statistic calculation processing for calculating a statistic of attribute values of the first IDs in each of the first ID clusters and calculating a statistic of attribute values of the second IDs in each of the second ID clusters, the prediction model generation processing, the co-clustering processing, and the statistic calculation processing are repeated until it is determined that the prescribed condition is satisfied, in determining a probability of a single first ID belonging to a single first ID cluster, the co-clustering means increases the probability as a difference decreases between an attribute value of the single first ID and a statistic that corresponds to the single first ID cluster, and in determining a probability of a single second ID belonging to a single second ID cluster, the co-clustering means increases the probability as a difference decreases between an attribute value of the single second ID and a statistic that corresponds to the single second ID cluster.

Further, a configuration may be employed that includes prediction means for predicting a relationship between a first ID and a second ID by using each of the prediction models in a case where the first ID and the second ID are specified.

Furthermore, the prediction means may be configured to calculate, for each of the prediction models, a value of the objective variable by using an attribute value of the specified first ID and an attribute value of the specified second ID, calculate, for each of the prediction models, the product of a probability of the specified first ID belonging to a first ID cluster that corresponds to a prediction model of interest and a probability of the specified second ID belonging to a second ID cluster that corresponds to the prediction model of interest, and derive, as a prediction result of a relationship between the specified first ID and the specified second ID, a result of performing weighted addition on the value of the objective variable that has been calculated for each of the prediction models by using the product that has been calculated for each of the prediction models.

The invention of the present application has been described above with reference to the exemplary embodiments, but the invention of the present application is not limited to the exemplary embodiments described above. Various changes that those skilled in the art could understand can be made to the configuration or details of the invention of the present application without departing from the scope of the invention of the present application.

INDUSTRIAL APPLICABILITY

The present invention is suitably applied to a prediction model generation system that generates a prediction model for predicting a relationship between two types of matters.

REFERENCE SIGNS LIST

1000 Prediction model generation system
1100 Learning unit
1110 Initializing unit
1120 Clustering unit
1121 Prediction model learning unit 1121
1122 Cluster allocating unit 1122
1123 Cluster information calculator 1123
1124 Termination determining unit 1124
1200 Storage
1300 Data input unit
1400 Learning result output unit
1600 Target input unit
1700 Prediction unit
1800 Prediction result output unit

The invention claimed is:
1. A prediction model generation system comprising:
a co-clustering unit implemented by a processor and that performs co-clustering processing for performing co-clustering on first IDs and second IDs in accordance with first master data, second master data, and fact data indicating a relationship between each of the first IDs and each of the second IDs, each of the first IDs serving as an ID of a record in the first master data, each of the second IDs serving as an ID of a record in the second master data;

a prediction model generation unit implemented by the processor and that performs prediction model generation processing for generating a prediction model for each combination of a first ID cluster and a second ID cluster, the prediction model using the relationship between each of the first IDs and each of the second IDs as an objective variable, the first ID cluster serving as a cluster of the first IDs, the second ID cluster serving as a cluster of the second IDs; and a determination unit implemented by the processor and that determines whether a prescribed condition is satisfied, wherein the prediction model generation processing and the co-clustering processing are repeated until it is determined that the prescribed condition is satisfied, in determining a probability of a single first ID belonging to a single first ID cluster, the co-clustering unit calculates a degree of an error between a results value and a predicted value of a relationship between the single first ID and each of the second IDs by using each of the prediction models that correspond to a combination of each of the second ID clusters and the single first ID cluster, and increases the probability as the degree of the error decreases, and in determining a probability of a single second ID belonging to a single second ID cluster, the co-clustering unit calculates a degree of an error between a results value and a predicted value of a relationship between the single second ID and each of the first IDs by using each of the prediction models that correspond to a combination of each of the first ID clusters and the single second ID cluster, and increases the probability as the degree of the error decreases.

2. The prediction model generation system according to claim 1, further comprising:

a statistic calculation unit implemented by the processor and that performs statistic calculation processing for calculating a statistic of attribute values of the first IDs in each of the first ID clusters and calculating a statistic of attribute values of the second IDs in each of the second ID clusters, wherein the prediction model generation processing, the co-clustering processing, and the statistic calculation processing are repeated until it is determined that the prescribed condition is satisfied, in determining a probability of a single first ID belonging to a single first ID cluster, the co-clustering unit increases the probability as a difference decreases between an attribute value of the single first ID and a statistic that corresponds to the single first ID cluster, and in determining a probability of a single second ID belonging to a single second ID cluster, the co-clustering unit increases the probability as a difference decreases between an attribute value of the single second ID and a statistic that corresponds to the single second ID cluster.

3. The prediction model generation system according to claim 1, further comprising:

a prediction unit implemented by the processor and that predicts a relationship between a certain first ID and a certain second ID by using each of the prediction models in a case where the certain first ID and the certain second ID are specified.

4. The prediction model generation system according to claim 3, wherein the prediction unit performs:

calculating, for each of the prediction models, a value of the objective variable by using an attribute value of the certain first ID that has been specified and an attribute value of the certain second ID that has been specified, calculating, for each of the prediction models, a product of a probability of the certain first ID belonging to a first ID cluster that corresponds to a prediction model of interest and a probability of the certain second ID belonging to a second ID cluster that corresponds to the prediction model of interest, and deriving, as a prediction result of the relationship between the certain first ID and the certain second ID, a result of performing weighted addition on the value of the objective variable that has been calculated for each of the prediction models by using the product that has been calculated for each of the prediction models.

5. A prediction model generation method comprising:

performing co-clustering processing for performing co-clustering on first IDs and second IDs in accordance with first master data, second master data, and fact data indicating a relationship between each of the first IDs and each of the second IDs, each of the first IDs serving as an ID of a record in the first master data, each of the second IDs serving as an ID of a record in the second master data;

performing prediction model generation processing for generating a prediction model for each combination of a first ID cluster and a second ID cluster, the prediction model using the relationship between each of the first IDs and each of the second IDs as an objective variable, the first ID cluster serving as a cluster of the first IDs, the second ID cluster serving as a cluster of the second IDs;

determining whether a prescribed condition is satisfied; and repeating the prediction model generation processing and the co-clustering processing until it is determined that the prescribed condition is satisfied, wherein in the co-clustering processing, when a probability of a single first ID belonging to a single first ID cluster is determined, a degree of an error is calculated between a results value and a predicted value of a relationship between the single first ID and each of the second IDs by using each of the prediction models that correspond to a combination of each of the second ID clusters and the single first ID cluster, and the probability is increased as the degree of the error decreases, and when a probability of a single second ID belonging to a single second ID cluster is determined, a degree of an error is calculated between a results value and a predicted value of a relationship between the single second ID and each of the first IDs by using each of the prediction models that correspond to a combination of each of the first ID clusters and the single second ID cluster, and the probability is increased as the degree of the error decreases.

6. The prediction model generation method according to claim 5, further comprising:
  performing statistic calculation processing for calculating a statistic of attribute values of the first IDs in each of the first ID clusters and calculating a statistic of attribute values of the second IDs in each of the second ID clusters; and
  repeating the prediction model generation processing, the co-clustering processing, and the statistic calculation processing until it is determined that the prescribed condition is satisfied, wherein
  in the co-clustering processing,
    when a probability of a single first ID belonging to a single first ID cluster is determined, the probability is increased as a difference decreases between an attribute value of the single first ID and a statistic that corresponds to the single first ID cluster, and
    when a probability of a single second ID belonging to a single second ID cluster is determined, the probability is increased as a difference decreases between an attribute value of the single second ID and a statistic that corresponds to the single second ID cluster.

7. A non-transitory computer-readable recording medium in which a prediction model generation program is recorded, the prediction model generation program causing a computer to execute a process comprising:
  performing co-clustering processing for performing co-clustering on first IDs and second IDs in accordance with first master data, second master data, and fact data indicating a relationship between each of the first IDs and each of the second IDs, each of the first IDs serving as an ID of a record in the first master data, each of the second IDs serving as an ID of a record in the second master data;
  performing prediction model generation processing for generating a prediction model for each combination of a first ID cluster and a second ID cluster, the prediction model using the relationship between each of the first IDs and each of the second IDs as an objective variable, the first ID cluster serving as a cluster of the first IDs, the second ID cluster serving as a cluster of the second IDs;
  performing determination processing for determining whether a prescribed condition is satisfied; and
  repeating the prediction model generation processing and the co-clustering processing until it is determined that the prescribed condition is satisfied, wherein
  in the co-clustering processing,
    when a probability of a single first ID belonging to a single first ID cluster is determined, a degree of an error is calculated between a results value and a predicted value of a relationship between the single first ID and each of the second IDs by using each of the prediction models that correspond to a combination of each of the second ID clusters and the single first ID cluster, and the probability is increased as the degree of the error decreases, and
    when a probability of a single second ID belonging to a single second ID cluster is determined, a degree of an error is calculated between a results value and a predicted value of a relationship between the single second ID and each of the first IDs by using each of the prediction models that correspond to a combination of each of the first ID clusters and the single second ID cluster, and the probability is increased as the degree of the error decreases.

8. The non-transitory computer-readable recording medium according to claim 7, the prediction model generation program causing the computer to execute the process further comprising:
  performing statistic calculation processing for calculating a statistic of attribute values of the first IDs in each of the first ID clusters and calculating a statistic of attribute values of the second IDs in each of the second ID clusters; and
  repeating the prediction model generation processing, the co-clustering processing, and the statistic calculation processing until it is determined that the prescribed condition is satisfied, wherein
  in the co-clustering processing,
    when a probability of a single first ID belonging to a single first ID cluster is determined, the probability is increased as a difference decreases between an attribute value of the single first ID and a statistic that corresponds to the single first ID cluster, and
    when a probability of a single second ID belonging to a single second ID cluster is determined, the probability is increased as a difference decreases between an attribute value of the single second ID and a statistic that corresponds to the single second ID cluster.

* * * * *